US008433283B2

(12) United States Patent
Borislow et al.

(10) Patent No.: US 8,433,283 B2
(45) Date of Patent: Apr. 30, 2013

(54) COMPUTER-RELATED DEVICES AND TECHNIQUES FOR FACILITATING AN EMERGENCY CALL VIA A CELLULAR OR DATA NETWORK USING REMOTE COMMUNICATION DEVICE IDENTIFYING INFORMATION

(75) Inventors: Daniel M. Borislow, Palm Beach, FL (US); Gregory Lynn Wood, Oneonta, AL (US)

(73) Assignee: YMax Communications Corp., West Palm Beach, FL (US)

( * ) Notice: Subject to any disclaimer, the term of this patent is extended or adjusted under 35 U.S.C. 154(b) by 671 days.

(21) Appl. No.: 12/360,818

(22) Filed: Jan. 27, 2009

(65) Prior Publication Data

US 2010/0190466 A1 Jul. 29, 2010

(51) Int. Cl.
*H04M 11/04* (2006.01)
(52) U.S. Cl.
USPC ............... 455/404.2; 455/404.1; 455/456.1
(58) Field of Classification Search ............... 455/404.2, 455/404.1, 403, 456.1–457
See application file for complete search history.

(56) References Cited

U.S. PATENT DOCUMENTS

| 3,906,166 A | 9/1975 | Cooper et al. |
|---|---|---|
| 3,973,200 A | 8/1976 | Åkerberg |
| 4,057,913 A | 11/1977 | Eisenberg |
| 4,494,119 A | 1/1985 | Wimbush |
| 4,539,557 A | 9/1985 | Redshaw |
| 4,596,988 A | 6/1986 | Wanka |
| 4,651,157 A | 3/1987 | Gray et al. |
| 4,692,742 A | 9/1987 | Raizen et al. |
| 4,833,477 A | 5/1989 | Tendler |
| 5,043,736 A | 8/1991 | Darnell et al. |
| 5,091,930 A | 2/1992 | Shapiro |
| 5,414,432 A | 5/1995 | Penny, Jr. et al. |
| 5,479,482 A | 12/1995 | Grimes |
| 5,555,286 A | 9/1996 | Tendler |

(Continued)

FOREIGN PATENT DOCUMENTS

| DE | 100 41 509 A1 | 2/2002 |
|---|---|---|
| EP | 1 527 561 | 1/2004 |

(Continued)

OTHER PUBLICATIONS

Anonymous, "911togo GPS Personal and Mobile Protection," http://www.911togo.com/, Product Information RGS Technologies (printed Sep. 27, 2006).

(Continued)

*Primary Examiner* — Chuong A Ngo
(74) *Attorney, Agent, or Firm* — Arnold & Porter LLP

(57) ABSTRACT

A device includes a transceiver and control logic. The control logic (a) receives one or more first signals carrying corresponding one or more cellular tower identifiers that each identifies a cellular tower, (b) determines signal strengths of the one or more first signals and a location of the device based on the one or more cellular tower identifiers, (c) receives a second signal corresponding to an emergency call, and (d) transfers, via a cellular network or a packet switched network, a third signal carrying an indicator of the location of the device to a remote device to aid emergency personnel in identifying the location of the device, the control logic implementing the emergency call as one of a cellular-based call via the cellular network or a VoIP call via the packet switched network.

37 Claims, 12 Drawing Sheets

U.S. PATENT DOCUMENTS

| | | | |
|---|---|---|---|
| 5,587,715 A | 12/1996 | Lewis | |
| 5,625,678 A | 4/1997 | Blomfield-Brown | |
| 5,703,902 A | 12/1997 | Ziv et al. | |
| 5,731,785 A | 3/1998 | Lemelson et al. | |
| 5,781,156 A | 7/1998 | Krasner | |
| 5,796,365 A | 8/1998 | Lewis | |
| 5,812,087 A | 9/1998 | Krasner | |
| 5,825,327 A | 10/1998 | Krasner | |
| 5,831,574 A | 11/1998 | Krasner | |
| 5,841,396 A | 11/1998 | Krasner | |
| 5,857,155 A | 1/1999 | Hill et al. | |
| 5,868,100 A | 2/1999 | Marsh | |
| 5,873,040 A | 2/1999 | Dunn et al. | |
| 5,874,914 A | 2/1999 | Krasner | |
| 5,884,214 A | 3/1999 | Krasner | |
| 5,945,944 A | 8/1999 | Krasner | |
| 5,953,263 A | 9/1999 | Farmwald et al. | |
| 5,999,124 A | 12/1999 | Sheynblat | |
| 6,002,363 A | 12/1999 | Krasner | |
| 6,016,119 A | 1/2000 | Krasner | |
| 6,021,371 A | 2/2000 | Fultz | |
| 6,037,977 A | 3/2000 | Peterson | |
| 6,052,081 A | 4/2000 | Krasner | |
| 6,061,018 A | 5/2000 | Sheynblat | |
| 6,064,336 A | 5/2000 | Krasner | |
| 6,075,458 A | 6/2000 | Ladner et al. | |
| 6,084,628 A | 7/2000 | Sawyer | |
| 6,104,338 A | 8/2000 | Krasner | |
| 6,104,340 A | 8/2000 | Krasner | |
| 6,104,711 A | 8/2000 | Voit | |
| 6,107,960 A | 8/2000 | Krasner | |
| 6,111,540 A | 8/2000 | Krasner | |
| 6,122,521 A | 9/2000 | Wilkinson et al. | |
| 6,128,304 A | 10/2000 | Gardell et al. | |
| 6,131,067 A | 10/2000 | Girerd et al. | |
| 6,133,871 A | 10/2000 | Krasner | |
| 6,133,874 A | 10/2000 | Krasner | |
| 6,137,869 A | 10/2000 | Voit et al. | |
| 6,150,980 A | 11/2000 | Krasner | |
| 6,169,497 B1 | 1/2001 | Robert | |
| 6,169,955 B1 | 1/2001 | Fultz | |
| 6,175,329 B1 | 1/2001 | Vicci | |
| 6,185,427 B1 | 2/2001 | Krasner et al. | |
| 6,208,290 B1 | 3/2001 | Krasner | |
| 6,208,291 B1 | 3/2001 | Krasner | |
| 6,215,441 B1 | 4/2001 | Moeglein et al. | |
| 6,215,442 B1 | 4/2001 | Sheynblat et al. | |
| 6,236,354 B1 | 5/2001 | Krasner | |
| 6,239,742 B1 | 5/2001 | Krasner | |
| 6,259,399 B1 | 7/2001 | Krasner | |
| 6,262,764 B1 | 7/2001 | Perterson | |
| 6,272,430 B1 | 8/2001 | Krasner | |
| 6,278,944 B1 | 8/2001 | Lui et al. | |
| 6,282,574 B1 | 8/2001 | Voit | |
| 6,289,041 B1 | 9/2001 | Krasner | |
| 6,298,062 B1 | 10/2001 | Gardell et al. | |
| 6,298,064 B1 | 10/2001 | Christie | |
| 6,304,572 B1 | 10/2001 | Christie | |
| 6,307,504 B1 | 10/2001 | Sheynblat | |
| 6,313,786 B1 | 11/2001 | Sheynblat et al. | |
| 6,314,308 B1 | 11/2001 | Sheynblat et al. | |
| 6,359,880 B1 | 3/2002 | Curry et al. | |
| 6,373,430 B1 | 4/2002 | Beason et al. | |
| 6,377,209 B1 | 4/2002 | Krasner | |
| 6,385,308 B1 | 5/2002 | Cohen et al. | |
| 6,408,196 B2 | 6/2002 | Sheynblat et al. | |
| 6,411,254 B1 | 6/2002 | Moeglein et al. | |
| 6,421,002 B2 | 7/2002 | Krasner | |
| 6,430,275 B1 | 8/2002 | Voit et al. | |
| 6,433,731 B1 | 8/2002 | Sheynblat et al. | |
| 6,433,734 B1 | 8/2002 | Krasner | |
| 6,452,932 B1 | 9/2002 | Christie | |
| 6,463,052 B1 | 10/2002 | Christie | |
| 6,473,429 B1 | 10/2002 | Christie | |
| 6,477,363 B1 | 11/2002 | Ayoub et al. | |
| 6,487,200 B1 | 11/2002 | Fraser | |
| 6,492,941 B1 | 12/2002 | Beason et al. | |
| 6,542,821 B2 | 4/2003 | Krasner | |
| 6,583,757 B2 | 6/2003 | Krasner | |
| 6,594,344 B2 | 7/2003 | Masri et al. | |
| 6,597,311 B2 | 7/2003 | Sheynblat et al. | |
| 6,603,844 B1 | 8/2003 | Chavez, Jr. et al. | |
| 6,633,561 B2 | 10/2003 | Christie | |
| 6,658,512 B1 | 12/2003 | Gokulrangan | |
| 6,665,294 B2 | 12/2003 | Christie | |
| 6,665,541 B1 | 12/2003 | Krasner et al. | |
| 6,675,254 B1 | 1/2004 | Wachel | |
| 6,677,894 B2 | 1/2004 | Sheynblat et al. | |
| 6,707,422 B2 | 3/2004 | Sheynblat et al. | |
| 6,720,915 B2 | 4/2004 | Sheynblat | |
| 6,724,807 B1 | 4/2004 | Krasner et al. | |
| 6,725,159 B2 | 4/2004 | Krasner | |
| 6,738,743 B2 | 5/2004 | Sharma et al. | |
| 6,763,102 B1 | 7/2004 | Chen et al. | |
| 6,763,226 B1 | 7/2004 | McZeal, Jr. | |
| 6,765,910 B1 | 7/2004 | Johnson | |
| 6,775,271 B1 | 8/2004 | Johnson et al. | |
| 6,775,360 B2 | 8/2004 | Davidson et al. | |
| 6,788,249 B1 | 9/2004 | Farmer et al. | |
| 6,789,066 B2 | 9/2004 | Junkins et al. | |
| 6,799,050 B1 | 9/2004 | Krasner | |
| 6,816,710 B2 | 11/2004 | Krasner | |
| 6,853,620 B2 | 2/2005 | Mauritz et al. | |
| 6,856,673 B1 | 2/2005 | Banks et al. | |
| 6,862,546 B2 | 3/2005 | Kaburlasos et al. | |
| 6,870,835 B1 | 3/2005 | Chen et al. | |
| 6,871,144 B1 | 3/2005 | Lee | |
| 6,874,025 B2 | 3/2005 | Hoogenboom et al. | |
| 6,895,000 B2 | 5/2005 | Lai et al. | |
| 6,910,149 B2 | 6/2005 | Perloff et al. | |
| 6,912,397 B2 | 6/2005 | Liou | |
| 6,912,398 B1 | 6/2005 | Domnitz | |
| 6,937,622 B2 | 8/2005 | Gross | |
| 6,941,147 B2 | 9/2005 | Liou | |
| 6,943,729 B2 | 9/2005 | Dobson | |
| 6,952,414 B1 | 10/2005 | Willig | |
| 6,982,945 B1 | 1/2006 | Gossett | |
| 6,986,030 B2 | 1/2006 | Shmueli et al. | |
| 6,990,328 B2 | 1/2006 | Crandall et al. | |
| 6,993,326 B2 | 1/2006 | Link, II et al. | |
| 6,996,525 B2 | 2/2006 | Bennett et al. | |
| 6,999,458 B2 | 2/2006 | Fowler | |
| 7,010,608 B2 | 3/2006 | Garg et al. | |
| 7,012,884 B2 | 3/2006 | Horne | |
| 7,027,844 B2 | 4/2006 | Nuovo | |
| 7,035,668 B2 | 4/2006 | Kobayashi | |
| 7,042,712 B2 | 5/2006 | Ghosh et al. | |
| 7,057,888 B2 | 6/2006 | Oakley | |
| 7,068,119 B2 | 6/2006 | Wachel | |
| 7,069,548 B2 | 6/2006 | Kushlis | |
| 7,079,498 B2 | 7/2006 | Ubale | |
| 7,088,673 B2 | 8/2006 | Horne | |
| 7,092,426 B2 | 8/2006 | Dobson et al. | |
| 7,124,202 B2 | 10/2006 | Lebizay et al. | |
| 7,127,526 B1 | 10/2006 | Duncan et al. | |
| 7,133,400 B1 | 11/2006 | Henderson et al. | |
| 7,136,875 B2 | 11/2006 | Anderson et al. | |
| 7,139,249 B2 | 11/2006 | Norris et al. | |
| 7,146,329 B2 | 12/2006 | Conkwright et al. | |
| 7,152,207 B1 | 12/2006 | Underwood et al. | |
| 7,158,943 B2 | 1/2007 | van der Riet | |
| 7,171,225 B2 | 1/2007 | Krasner et al. | |
| 7,177,399 B2 | 2/2007 | Dawson et al. | |
| 7,197,311 B2 | 3/2007 | Matusz | |
| 7,203,740 B1 | 4/2007 | Putzolu et al. | |
| 7,212,615 B2 | 5/2007 | Wolmuth | |
| 7,239,253 B1 | 7/2007 | Denninghoff | |
| 7,245,237 B2 | 7/2007 | Lopez-Estrada | |
| 7,245,637 B2 | 7/2007 | Lam et al. | |
| 7,257,417 B1 | 8/2007 | Krasner | |
| 7,259,750 B2 | 8/2007 | Ghosh et al. | |
| 7,266,123 B1 | 9/2007 | Johnson et al. | |
| 7,283,515 B2 | 10/2007 | Fowler | |
| 7,283,548 B2 | 10/2007 | Denninghoff | |
| 7,286,483 B2 | 10/2007 | Connor | |
| 7,289,525 B2 | 10/2007 | Lebizay et al. | |
| 7,292,530 B2 | 11/2007 | Christensen | |

| | | |
|---|---|---|
| 7,292,558 B2 | 11/2007 | Adrangi et al. |
| 7,292,587 B2 | 11/2007 | Knauerhase et al. |
| 7,292,866 B2 | 11/2007 | Shoki et al. |
| 7,298,745 B2 | 11/2007 | Egevang |
| 7,305,240 B2 | 12/2007 | Chou et al. |
| 7,315,521 B2 | 1/2008 | Gadamsetty et al. |
| 7,321,925 B2 | 1/2008 | Trethewey |
| 7,324,516 B2 | 1/2008 | Daniel et al. |
| 7,336,654 B2 | 2/2008 | Barkley et al. |
| 7,349,995 B2 | 3/2008 | Hamilton |
| 7,369,856 B2 | 5/2008 | Ovadia |
| 7,372,871 B2 | 5/2008 | Grecco et al. |
| 7,372,957 B2 | 5/2008 | Strathmeyer et al. |
| 7,386,111 B2 | 6/2008 | Holder |
| 7,394,800 B2 | 7/2008 | Sood et al. |
| 7,426,199 B2 | 9/2008 | Sondur et al. |
| 2002/0016189 A1 | 2/2002 | Sheynblat et al. |
| 2002/0017557 A1 | 2/2002 | Hendrick |
| 2002/0078367 A1 | 6/2002 | Lang et al. |
| 2002/0101965 A1 | 8/2002 | Elzur |
| 2002/0106999 A1 | 8/2002 | Wu |
| 2002/0162009 A1 | 10/2002 | Shmueli et al. |
| 2002/0194000 A1 | 12/2002 | Bennett et al. |
| 2003/0025632 A1 | 2/2003 | Sheynblat et al. |
| 2003/0035004 A1 | 2/2003 | Dove et al. |
| 2003/0064755 A1 | 4/2003 | Piwowarski |
| 2003/0112141 A1 | 6/2003 | Arunkumar |
| 2003/0144007 A1* | 7/2003 | Johansson et al. ............ 455/456 |
| 2003/0212485 A1 | 11/2003 | Michmerhuizen |
| 2003/0212684 A1 | 11/2003 | Meyer et al. |
| 2003/0212838 A1 | 11/2003 | Yen et al. |
| 2004/0003385 A1 | 1/2004 | Kushlis |
| 2004/0030791 A1 | 2/2004 | Dorenbosch et al. |
| 2004/0062257 A1 | 4/2004 | Nguyen |
| 2004/0076121 A1 | 4/2004 | Yang et al. |
| 2004/0086093 A1 | 5/2004 | Schranz |
| 2004/0095935 A1 | 5/2004 | Connor |
| 2004/0105430 A1 | 6/2004 | Zen et al. |
| 2004/0160946 A1 | 8/2004 | Fowler |
| 2004/0172526 A1 | 9/2004 | Tann et al. |
| 2004/0203461 A1 | 10/2004 | Hay |
| 2004/0203850 A1 | 10/2004 | Oesterling |
| 2004/0205777 A1 | 10/2004 | Zalenski et al. |
| 2004/0205778 A1 | 10/2004 | Wong et al. |
| 2004/0218583 A1 | 11/2004 | Adan et al. |
| 2004/0223458 A1 | 11/2004 | Gentle |
| 2004/0248590 A1 | 12/2004 | Chan et al. |
| 2005/0002506 A1 | 1/2005 | Bender et al. |
| 2005/0015540 A1 | 1/2005 | Tsai et al. |
| 2005/0021522 A1 | 1/2005 | Herman et al. |
| 2005/0047574 A1 | 3/2005 | Reid |
| 2005/0100081 A1 | 5/2005 | Dobson et al. |
| 2005/0122921 A1 | 6/2005 | Seo |
| 2005/0135516 A1 | 6/2005 | Javor et al. |
| 2005/0163311 A1 | 7/2005 | Fowler et al. |
| 2005/0169073 A1 | 8/2005 | Cook et al. |
| 2005/0172279 A1 | 8/2005 | Cook et al. |
| 2005/0190892 A1 | 9/2005 | Dawson et al. |
| 2005/0198221 A1 | 9/2005 | Manchester et al. |
| 2005/0201414 A1 | 9/2005 | Awais |
| 2005/0207432 A1 | 9/2005 | Velez-Rivera et al. |
| 2005/0213716 A1 | 9/2005 | Zhu et al. |
| 2005/0216260 A1 | 9/2005 | Ps et al. |
| 2005/0227703 A1 | 10/2005 | Cheng |
| 2005/0232268 A1 | 10/2005 | Gross |
| 2005/0240918 A1 | 10/2005 | Shlomai |
| 2005/0243733 A1 | 11/2005 | Crawford et al. |
| 2005/0245269 A1 | 11/2005 | Demirhan et al. |
| 2005/0249147 A1 | 11/2005 | Fowler |
| 2005/0251456 A1 | 11/2005 | Perkowski |
| 2005/0270063 A1 | 12/2005 | Cornett |
| 2006/0003796 A1 | 1/2006 | Vireday et al. |
| 2006/0004627 A1 | 1/2006 | Baluja |
| 2006/0026269 A1 | 2/2006 | Sadovsky et al. |
| 2006/0031393 A1 | 2/2006 | Cooney et al. |
| 2006/0033660 A1 | 2/2006 | Dodson |
| 2006/0034296 A1 | 2/2006 | Talucci |
| 2006/0061962 A1 | 3/2006 | Oakley |
| 2006/0064505 A1 | 3/2006 | Lee et al. |
| 2006/0077971 A1 | 4/2006 | Fowler |
| 2006/0088025 A1 | 4/2006 | Barkley et al. |
| 2006/0089153 A1* | 4/2006 | Sheynblat .................. 455/456.1 |
| 2006/0114854 A1 | 6/2006 | Wotherspoon et al. |
| 2006/0126560 A1 | 6/2006 | Wotherspoon et al. |
| 2006/0136912 A1 | 6/2006 | Robinson et al. |
| 2006/0168015 A1 | 7/2006 | Fowler |
| 2006/0168167 A1 | 7/2006 | Kushalnagar et al. |
| 2006/0178903 A1 | 8/2006 | Cruz-Rivera |
| 2006/0187900 A1 | 8/2006 | Akbar |
| 2006/0210036 A1 | 9/2006 | Citron et al. |
| 2006/0215607 A1 | 9/2006 | Mitchel et al. |
| 2006/0229029 A1 | 10/2006 | Waltho et al. |
| 2006/0245481 A1 | 11/2006 | Dobson et al. |
| 2006/0268961 A1 | 11/2006 | Prestwich et al. |
| 2006/0274729 A1 | 12/2006 | Self |
| 2006/0277108 A1 | 12/2006 | Altberg et al. |
| 2006/0282571 A1 | 12/2006 | Choi et al. |
| 2006/0294262 A1 | 12/2006 | Su |
| 2007/0002819 A1 | 1/2007 | Sood et al. |
| 2007/0013516 A1 | 1/2007 | Freitag et al. |
| 2007/0022289 A1 | 1/2007 | Alt et al. |
| 2007/0025331 A1 | 2/2007 | Laurent et al. |
| 2007/0025338 A1 | 2/2007 | Benditovich et al. |
| 2007/0025344 A1 | 2/2007 | Rothman et al. |
| 2007/0032225 A1 | 2/2007 | Konicek et al. |
| 2007/0032240 A1 | 2/2007 | Finnegan et al. |
| 2007/0036134 A1 | 2/2007 | Huang et al. |
| 2007/0058613 A1 | 3/2007 | Beckemeyer |
| 2007/0060109 A1 | 3/2007 | Ramer et al. |
| 2007/0060124 A1 | 3/2007 | Kalavade |
| 2007/0064679 A1 | 3/2007 | Chitturi |
| 2007/0073585 A1 | 3/2007 | Apple et al. |
| 2007/0083927 A1 | 4/2007 | Swaroop |
| 2007/0112979 A1 | 5/2007 | Peng |
| 2007/0121567 A1 | 5/2007 | Venkatachalam et al. |
| 2007/0157025 A1 | 7/2007 | Sastry et al. |
| 2007/0160086 A1 | 7/2007 | Huang et al. |
| 2007/0189270 A1 | 8/2007 | Borislow et al. |
| 2007/0189271 A1* | 8/2007 | Borislow et al. ............... 370/352 |
| 2007/0192832 A1 | 8/2007 | Qi et al. |
| 2007/0201450 A1* | 8/2007 | Borislow et al. ............... 370/356 |
| 2007/0248081 A1 | 10/2007 | Barkley et al. |
| 2008/0004009 A1 | 1/2008 | Caldwell et al. |
| 2008/0014941 A1 | 1/2008 | Catovic et al. |
| 2008/0014956 A1 | 1/2008 | Balasubramanian |
| 2008/0025291 A1 | 1/2008 | Barkley et al. |
| 2008/0032706 A1* | 2/2008 | Sheynblat et al. ......... 455/456.1 |
| 2008/0117932 A1 | 5/2008 | Daniel et al. |
| 2008/0233905 A1 | 9/2008 | Mohanty et al. |
| 2008/0240612 A1 | 10/2008 | Liang et al. |
| 2008/0243501 A1 | 10/2008 | Hafsteinsson et al. |
| 2008/0244148 A1 | 10/2008 | Nix, Jr. et al. |
| 2008/0247531 A1 | 10/2008 | Borislow et al. |
| 2008/0294503 A1 | 11/2008 | Borislow et al. |
| 2009/0209224 A1 | 8/2009 | Borislow et al. |

FOREIGN PATENT DOCUMENTS

| | | |
|---|---|---|
| EP | 1 463 280 A2 | 9/2004 |
| EP | 1 494 488 A1 | 1/2005 |
| EP | 1 733 492 | 9/2005 |
| EP | 1 779 255 | 3/2006 |
| EP | 1 841 256 A1 | 10/2007 |
| JP | 2003-289379 A | 10/2003 |
| JP | 2003-345601 | 12/2003 |
| JP | 2004-350063 A | 12/2004 |
| JP | 2005-27247 A | 1/2005 |
| JP | 2005-086817 A | 3/2005 |
| KR | 2003-0071971 | 9/2003 |
| WO | WO 03/021851 A2 | 3/2003 |
| WO | WO 2004/006511 A1 | 1/2004 |
| WO | WO 2005/004443 A2 | 1/2005 |
| WO | WO 2005/004443 A3 | 1/2005 |
| WO | WO 2005/031989 A2 | 4/2005 |
| WO | WO 2005/039086 A2 | 4/2005 |
| WO | WO 2005/050241 A2 | 6/2005 |
| WO | WO 2005/086964 A2 | 9/2005 |
| WO | WO 2005/086964 A3 | 9/2005 |
| WO | WO 2006/028674 A2 | 3/2006 |

| | | | |
|---|---|---|---|
| WO | WO 2006/045031 A2 | 4/2006 |
| WO | WO 2006/045031 A3 | 4/2006 |
| WO | WO 2006/130388 A2 | 12/2006 |
| WO | WO 2007/095291 A2 | 8/2007 |
| WO | WO 2008/124447 A1 | 10/2008 |
| WO | WO 2008/148061 A1 | 12/2008 |
| WO | WO 2009/105578 A1 | 8/2009 |

OTHER PUBLICATIONS

Anonymous, "911ToGo.Com GPS personal and GPS asset security locators . . . ", http://www.911togo.com/gps_child_locator_watch/index.html, Product Information, RGS Technologies (printed Sep. 27, 2006).

Anonymous, "911ToGo.Com Locate your child fast . . . ", http://www.911togo.com/gps_child_locator_watch/gps-child-locator.html, Product Information, RGS Technologies (printed Sep. 27, 2006).

Anonymous, "911ToGo.Com Quick Answers to Your Most Frequently Asked Questions. . . ", http://www.911togo.com/gps_child_locator_watch/gps-watch-faq.html, Product Information, RGS Technologies (printed Sep. 27, 2006).

Anonymous, "911ToGo.Com RGS Technologies Monthly Service Plans", http://www.911togo.com/gps_child_locator_watch/serviceplans.html, Product Information, RGS Technologies (printed Sep. 27, 2006).

Anonymous, "A VoIM Solution Provider," company website at www-f3.com.tw, F3 Inc. (2006).

Anonymous, "ABC News Now Brings Breaking News, Feature Stories and More to VisiFone Subscribers," Press Release, http://www.viseonmedia.com/release13.html (Sep. 13, 2005).

Anonymous, "About NextAlarm.com," Company/Product Information, https://nextalarm.com/aboutus.jsp, NextAlarm.com Inc. (printed Oct. 10, 2006).

Anonymous, "Actiontec VoSky Call Centre," Product Information, http://www.eupac.co.uk/s.nl/sc.2/category.11/it.A/id.236/.f (printed Apr. 11, 2006).

Anonymous, "ATA Box for VOIP Phone", Product Information on Shenzhen Trxcom Electronics Co., Ltd. Model No. ATA-1000, http://trxcom.en.alibaba.com/product/0/50224401/ATA_Box_for_VOIP_Phone.html, Alibaba.com (printed Jan. 26, 2006).

Anonymous, "Autonomy Delivers Agentware i3™ Product Line," Press Release, http://www.autonomy.com/content/News/Releases/1997/0805.en.html, Autonomy, Inc. (Apr. 11, 2007).

Anonymous, "Big-button 'cell' phone," online posting, http://www.halfbakery.com/idea/Big-button_20_27cell_27_20phone, halfbakery (printed Sep. 27, 2006).

Anonymous, "Bria 2.1 for Windows User Guide," CounterPath Solutions, Inc., Vancouver, Canada (May 2007).

Anonymous, "Bria Features," Product Information, http://www.counterpath.com/bria-features.html (printed Oct. 24, 2007).

Anonymous, "Cellular Telephones", Product Information, http://www.haieramerica.com/categories.phop?cat=Cellular Telephones, Haier America (printed Apr. 14, 2005).

Anonymous, "Cellular Wrist-watch for Kids! GL GPS-911," Press Release, http://express-press-release.com/27/CELLULAR%20WRIST-WATCH%20for%20KIDS!. . . , Express-Press-Release.com (Jul. 18, 2006).

Anonymous, "Cisco ATA 186 Analog Telephone Adaptor", Product Summary, Cisco Systems, Inc. (2006).

Anonymous, "CISCO ATA-186", product information, http://web.archive.org/web/20040830025939/www.fonosip.com/english/ata_186.htm, FonoSIP.com (Aug. 2004).

Anonymous, "Cisco IP SoftPhone 1.3", product summary, Cisco Systems, Inc. (2002).

Anonymous, "Cisco SIP Proxy Server Administrator Guide, Version 2.0", Cisco Systems, Inc. (2002).

Anonymous, "Commatch 6004 SIP to V5.2 Access Gateway", Product Summary, Telrad Networks Ltd. (2006).

Anonymous, "CommercialVoipServices", webpage, http://www.toyz.org/cgi-bin./sipwiki.cgi/CommercialVoipServices (printed Nov. 8, 2007).

Anonymous, "Company Overview", Company/Product Summary, http://www.quorumsystems.com/overview.html, Quorum Systems, Inc. (printed Apr. 7, 2005).

Anonymous, "CounterPath's eyeBeam™ & Pocket PC SIP Softphone," Company Information, http://web.archive.org/web/20051217085311/www.counterpath.com/index.php?menu=O . . . , CounterPath Solutions, Inc. (Dec. 2005).

Anonymous, "Cypress Introduces Portable USB 2.0 Full-Speed Flash Drive Reference Design", Press Release, http://www.design-reuse.com/news/3467/cypress-portable-usb-2-0-full-speed-flash-drive-reference-design.html, Design and Reuse (Jul. 1, 2002).

Anonymous, "Data Connection Announces DC-MetaSwitch Multiservice Switching Software", Press Release, Comtex News Network (Apr. 12, 1999).

Anonymous, "Emergency mobile phone," Product Information, http://www.vitaphone.de/en/emergency_mobile_phone (printed Sep. 27, 2006).

Anonymous, "EmporiaLife," Product Information, http://www.emporia.at/shop/gb/index.php (printed Sep. 27, 2006).

Anonymous, "Enhanced Billing Support for SIP Gateways", product documentation, http://www.cisco.com/univercd/cc/td/doc/product/software/ios122/122newft/122.imit/122 . . . , Cisco Systems, Inc. (Sep. 8, 2003).

Anonymous, "Enterprise Seamless Mobility—Collaborators", http://www.motorola.com/wlan/collaborators.html, Product Information, Motorola Inc. (printed Apr. 7, 2005).

Anonymous, "Enterprise Seamless Mobility—Overview", http://www.motorola.com/wlan/index.html, Product Information, Motorola Inc. (printed Apr. 7, 2005).

Anonymous, "Enterprise Seamless Mobility—Solution—Motorola CN620", http://www.motorola.com/wlan/the_solution.html, Product Information, Motorola Inc. (printed Apr. 7, 2005).

Anonymous, "Enterprise Seamless Mobility—Solution", http://www.motorola.com/wlan/solution_cn620.html, Product Information, Motorola Inc. (printed Apr. 7, 2005).

Anonymous, "Enterprise Seamless Mobility—Technology—Power Management", http://www.motorola.com/wlan/technology_power.html, Product Information, Motorola Inc. (printed Apr. 7, 2005).

Anonymous, "Enterprise Seamless Mobility—Technology", http://www.motorola.com/wlan/technology.html, Product Information, Motorola Inc. (printed Apr. 7, 2005).

Anonymous, "EVoIP-4310", Product Summary, i2Telecom International, Inc. (Jul. 20, 2004).

Anonymous, "eyeBeam 1.11 User Guide," CounterPath Solutions, Inc., Vancouver, Canada (2005).

Anonymous, "eyeP Phone Desktop <SIP>", Product Summary, eyeP Media (2006).

Anonymous, "EZLoop™ USB VoIP Phone," Product Information and linked diagrams, http://www.teletronics.com/voipusbphone.html, Teletronics International Inc. (2006).

Anonymous, "EZLoop™ VoIP Wireless Phone," Product Information, http://www.teletronics.com/voipwifi.html, Teletronics International Inc. (2006).

Anonymous, "First Wi-Fi phone for Skype introduced", online article, http://www.msnbc.msn.com/id/10712110/print/1/displaymode/1098/, The Associated Press (Jan. 4, 2006).

Anonymous, "FonoSIP.com—Getting Started with X-Ten Lite", product information, http://web.archive.org/web/20070304075456/www.fonosip.com/english/xten-howto.html, FonoSIP.com (Mar. 2007).

Anonymous, "Form: 10KSB", Annual Report for Xten Networks, Inc., http://sec.edgar-online.com/2004/07/29/ 0001085037-04-000808/Section2.asp, EDGAR Online, Inc. (form filed Jul. 29, 2004).

Anonymous, "Fortemedia's AMBIN FM1083, a USB Echo Canceller/Noise Suppressor for PC VoIP, Portable USB . . . ", Press Release, http://www.allbusiness.com/media-telecommunications/internet-www/5205193-1.html, Business Wire (Aug. 23, 2004).

Anonymous, "Free PC to PC calls. Very cheap calls to standard phone numbers world wide." Product Review of AU-100 USB Phone, http://www.dontronics.com/usbphone.html, Dontronics (2006).

Anonymous, "Frequently Asked Questions," Product Information, http://www.adt.com/resi/customer_service/faqs/, ADT Security Services, Inc. (printed Oct. 10, 2006).

Anonymous, "GE Simon 3 Wireless Security System," Product Information, https://nextalarm.com/products.jsp;jsessionid=95A1098, NextAlarm.com, Inc. (printed Oct. 10, 2006).

Anonymous, "GloPhone Blue Download," Product Information, http://www.softsea.com/review/GloPhone-Blue.html, SoftSea.com (Sep. 9, 2004).

Anonymous, "GloPhone Express," Product Information, http://web.archive.org/web/20040415124641/www.voiceglo.com/glophone_express, theglobe.com, Inc. (Apr. 2004).

Anonymous, "GloPhone Tutorial," Product Information, http://web.archive.org/web/20040415155148/www.voiceglo.com/webphone/tutorial2, theglobe.com, Inc. (Apr. 2004).

Anonymous, "GloPhone," Product Information, http://web.archive.org/web/20040614181447/voiceglo.com/webphone, theglobe.com, Inc.. (Jun. 2004).

Anonymous, "GloPhone," Product Information, http://web.archive.org/web/20040325131659/www.glophone.com, theglobe.com, Inc. (Mar. 2004).

Anonymous, "G-MobilePhone: Innovative GPS Cell Phones . . . ", Product Information, http://www.911togo.com/GPS_child_tracking_phone/index.html, RGS Technologies (printed Sep. 27, 2006).

Anonymous, "Google secures mobile ad patent, buys wireless co.", summary of online article, the Financial Post, the National Post Company (2006).

Anonymous, "GpsAnywhere!", Product Information, http://www.gpsanywhere.com/, RGS Technologies (printed Sep. 27, 2006).

Anonymous, "GPS-Track.com GPS Locator and 911 help button for children!" Product Information, http://www.gps-track.com/GPSsolutions/91 1-GPS/index.html, RGS Technologies (printed Sep. 27, 2006).

Anonymous, "GPS-Track.com Next Generation GPS Technologies, PSC Specification," Product Information, http://www.gps-track.com/ GPSsolutions/911-GPS/911-alert.html, RGS Technologies (printed Sep. 27, 2006).

Anonymous, "GPS-Track.com Next Generation GPS Technologies, PSC Specifications" Product Information, http://www.gps-track.com/GPSsolutions/911-GPS/specs.html, RGS Technologies (printed Sep. 27, 2006).

Anonymous, "GPS-Track.com Next Generation GPS Technologies," Product Information, http://www.gps-track.com/GPSsolutions/911-GPS/GPS-child-locator.html, RGS Technologies (printed Sep. 27, 2006).

Anonymous, "GPS-Track.com Smart Track GPS Dealer Network," Product Information, http://www.gps-track.com/GPSsolutions/911-GPS/about911togo.html, RGS Technologies (printed Sep. 27, 2006).

Anonymous, "Haier P7 Cell Phone Introduced At CES 2005", Press Release, http://www.haieramerica.com/news_and_new_products.php?mode=print&id=21, Haier America (printed Apr. 14, 2005).

Anonymous, "Home Controls," Product Information, http://www.adt.com/resi/products_services/browse_system_components/component/?subCategory=76& . . . , ADT Security Services, Inc. (printed Oct. 10, 2006).

Anonymous, "Home Security Store," Product Information, http://monitoring.homesecuritystore.com/, Home Security Store, Inc. (printed Oct. 10, 2006).

Anonymous, "How do I Configure My Cisco IP Phone 7960/7940?", product information, http://web.archvie.org/web/20061029085943/www.fonosip.com/english/7960_40.html, FonoSIP.com (Oct. 2006).

Anonymous, "How to Distribute VoIP Throughout a Home," online article, http://michigantelephone.mi.org/distribute.html (printed Oct. 10, 2006).

Anonymous, "i2 Telecom Delivers Revolutionary VoIP Product for Small Office/Home Office Users", Press Release, http://web.archive.org/web/20031015145943/www.i2telecom.com/press_materials/releases/2003_10_08.h . . . (Oct. 8, 2003).

Anonymous, "i2Telecom International Receives Order from Verso Technologies for 3,000 InternetTalker MG-3 VoIP Micro Gateways", Press Release (Oct. 18, 2004).

Anonymous, "i2Telecom Receives Notice of Allowance from U.S. Patent and Trademark Office for VoiceStick(R) Patent", Press Release, http://www.tmcnet.com/scripts/print-page.aspx?PagePrint=http%3a%2f%2 fwww.tmcnet.com%2fusubmit%2f2007%2f09%2f27%2f2970746.htm, Technology Marketing Corporation (Sep. 27, 2007).

Anonymous, "i2Telecom", Company Information, http://www.voicestick.com/Company/, i2Telecom (printed Oct. 2, 2007).

Anonymous, "Important Information for ADT® Customers Considering Changes to Your Home Telephone Service, 'Safe & Sound'," Product Information, http://www.adt.com/resi/safe_and_sound/story3/, ADT Security Services, Inc. (printed Oct. 10, 2006).

Anonymous, "Important Information for ADT® Customers Considering Changes to Your Home's Telephone Service, 'VOIP'," Product Information, http://www.adt.com/resi/system_packages/VOIP/, ADT Security Services, Inc. (printed Oct. 10, 2006).

Anonymous, "Innomedia Introduces USB Device for Portable Voice-over-IP", Press Release, InnoMedia Incorporated (Oct. 5, 2000).

Anonymous, "InnovAlarm VoIP-based Alarm System," Product Information, Now, http://www.voipnow.org/2006/08/innovalarm_voip.html, Dotmarketer (Aug. 17, 2006).

Anonymous, "Integrating VoIP with Monitored Security Systems," Product Information, http://www.allied-security.com/security/voip.htm, Allied Fire & Security (printed Oct. 10, 2006).

Anonymous, "InternetTalker™ MG-3 Microgateway", Product Support, http://images.google.com/imgres?imgurl=http://www.i2telecom.com/networkstatus/press_materials/photos/tn_MG-3%20 . . . (printed Oct. 2, 2007).

Anonymous, "Intrado Announces Availability of VoIP E9-1-1 Solution for Wireless Service Providers . . . ", Press Release, http://www.businesswire.com/news/google/20050913005144/en, Business Wire (Sep. 13, 2005).

Anonymous, "IPEVO Free-1 USB Phone Review," Product Information, http://www.everythingusb.com/ipevo-free-1_usb_phone.html, Everything USB (2006).

Anonymous, "IVR Technologies and Digiquant Complete Integration for SIP-based VoIP Network Operator", News Release, http://web.archive.org/web/ 20030808110832/ivr.com/News/20021010.htm (Oct. 10, 2002).

Anonymous, "IVR Technologies and VegaStream complete SIP Interoperability Testing for IVR and Real-time Billing in Next-generation VoIP Networks", News Release, http://web.archive.org/web/20030808111029/ivr.com/News/20020926.htm (Sep. 26, 2002).

Anonymous, "Japan's number one carrier offers 3G/VoIP Linux phone", Product Information, http://linuxdevices.com/cgi-bin/printerfriendly.cgi?id=NS4156227772, Ziff Davis Publishing Holdings Inc. (Nov. 19, 2004).

Anonymous, "Jitterbug oneTouch™," Product Information, http://www.gojitterbug.com/Easy-Cell-Phones/simple-cell-phones.html, GreatCall, Inc. (printed Sep. 27, 2006).

Anonymous, "MG-2, InternetTalker™", Products & Services, http://web.archive.org/web/20031012011441/www.i2telecom.com/products.html, i2 Telecom (Oct. 2003).

Anonymous, "Motorola phones to Call on Wi-Fi, VoIP", Press Release, ZDNET News via NewsEdge Corporation, CNET Networks, Inc. (Feb. 15, 2005.

Anonymous, "N60 GSM/GPRS Tri-Band Handset with Wi-Fi", Product Information, http://www.haieramerica.com/products.php?mode=print&pid=1235, Haier America (printed Apr. 14, 2005).

Anonymous, "Need SIP Softphone that runs without installation (Windows)", online discussion, http://www.broadbandreports.com/forum/r19161737-Need-SIP-Softphone-that-runs-witho . . . . , dslreports.com (Oct. 19, 2007).

Anonymous, "New Linux cameraphone supports Wi-Fi via SDIO", Product Information, http://linuxdevices.com/cgi-bin/printerfriendly.cgi?id=NS6676362361, Ziff Davis Publishing Holdings Inc. (Mar. 14, 2005).

Anonymous, "NEWS FLASH: Finally, a US Linux smartphone", Product Information, http://linuxdevices.com/cgi-bin/printerfriendly.cgi?id=NS3567256959, Ziff Davis Publishing Holdings Inc. (Jul. 30, 2004).

Anonymous, "Next Version of StanaPhone Releases; Now Includes . . . ", Press Release, StanaPhone (Aug. 11, 2004).

Anonymous, "NextAlarm.com Alarm System Monitoring Over Standard Phone Line or Over Broadband Internet," Company/Product Information, https://nextalarm.com/index.jsp, NextAlarm.com, Inc. (printed Oct. 10, 2006).

Anonymous, "P7 Cell Phone From Haier at the Golden Globes", Press Release, http://www.haieramerica.com/news_and_new_products.php? mode=print&id=26, Haier America (printed Apr. 14, 2005).

Anonymous, "Pocket LOOX 700 Series", excerpt from Operating Manual, Fujitsu Siemens (Dec. 2004).

Anonymous, "Premier Innovative GPS Cell Phones . . . ", Product Information, http://www.safefones.com/, RGS Technologies (printed Sep. 27, 2006).

Anonymous, "ProSLIC® Programmable CMOS SLIC/Codec with Ringing/Battery Voltage Generation," Si3215 Product Manual, Rev. 0.92, Silicon Laboratories (2005).

Anonymous, "Quorum Connected—Merging Wireless Worlds", Company Information, http://www.quorumsystems.com, Quorum Systems, Inc. (printed Apr. 5, 2005).

Anonymous, "SIP Registration", instructions for use excerpted from *Session Initiation Protocol (SIP) Basic Call Flow Examples [RFC-Ref]*, http://rfc-ref.org/RFC-TEXTS/3665/chapter2.html (printed Nov. 6, 2007).

Anonymous, "SIP Session Establishment", instructions for use excerpted from *Session Initiation Protocol (SIP) Basic Call Flow Examples [RFC-Ref]*, http://rfc-ref.org/RFC-TEXTS/3665/chapter3.html (printed Nov. 6, 2007).

Anonymous, "SIP: Protocol Overview", Radvision Ltd. (2001).

Anonymous, "sipLite SoftPhone", product summary, http://iaxtalk.com/index.php?main_page=product_info&cPath=6&products_id=30, iaxTalk.com (Apr. 18, 2007).

Anonymous, "sipLite softphone", product summary, http://iaxtalk.com/voice/tiki-index.php?page=sipLite%20softphone, iaxTalk.com (printed Nov. 8, 2007).

Anonymous, "SJphone™ User's Guide", SJ Labs, Inc. (2004).

Anonymous, "SJphone™", product summary, SoftJoys Labs, Inc. (2003).

Anonymous, "SKY IPMate T-20 Skype USB Phone Adapter," Product Information, http://www.globalsources.com/gsol/I/USB-VoIP/p/2000000003844 /3000000149681/sm/10 . . . , Trade Media Ltd. (2006).

Anonymous, "Skyaid Watch: The wristwatch that can save a life!", Product Information, http://www.skyaid.org/LifeWatch/life_watch.htm, VMN LLC (Oct. 12, 2002).

Anonymous, "Smartphone with Optional Wi-Fi Coming Soon From Haier", Press Release, http://www.haieramerica.com/news_and_new_products.php?mode=print&id=30, Haier America (printed Apr. 14,2005).

Anonymous, "Soft Phone", Product Summary, http://www.telradconnegy.com/eng/products.php?actions=show&id=154, Telrad Connegy (2007).

Anonymous, "StanaPhone is No Longer an 'Interconnected VoIP Provider'", Press Release, Business Wire (Nov. 22, 2005).

Anonymous, "Stanaphone review", product review, http://www.geekzone.co.nz/content.asp?ContentId=3016, Geekzone (Jul. 12, 2004).

Anonymous, "Streaming interactive rich media—directly into the home." Product Information of ViseonMedia, http://www.viseonmedia.com, VMN LLC (2005).

Anonymous, "SysMaster Adds SIP Functionality to its VoIP Gateway", press release, http://www.sysmaster.com/press/c_press022003.php, SysMaster Corporation (Feb. 20, 2003).

Anonymous, "Tacticomp™0 1.5", Product Summary, http://inter-4.com/products/T15.htm, Sierra Nevada Corporation (printed Nov. 8, 2007).

Anonymous, "Tacticomp™ 5", Product Summary, http://inter-4.com/products/T5.html, Sierra Nevada Corporation (printed Nov. 8, 2007).

Anonymous, "Tacticomp™ 6", Product Summary, http://inter-4.com/products/T6.html, Sierra Nevada Corporation (printed Nov. 8, 2007).

Anonymous, "Telemedicine on the web," Product Information, http://www.vitaphone.de/en/ (printed Sep. 27, 2006).

Anonymous, "Telrad Connegy Unveiling IP Base Telephony System", Product News, http://www.telrad.co.uk/ip_system.html, Iridiacom Ltd. (Dec. 16, 2003).

Anonymous, "The Sereno QS2000", Product Information, http://www.quorumsystems.com/products/2530.html, Quorum Systems, Inc. (printed Apr. 7, 2005).

Anonymous, "The Smallest Skype Voip Device on the World!," Product Information, Sky Microwave Limited Company (2005).

Anonymous, "The World's First Free Telephone Service Launches: StanaPhone Communications Unveils Easy-to-Use StanaPhone" Press Release, http://press.arrivenet.com/technology/article.php/419957.html, ArriveNet LTD., RLLLP (Jun. 4, 2004).

Anonymous, "TIGER560C", Product Overview, TigerJet Network, Inc. (Revision 0.9—Aug. 15, 2003; Revision 1.0—May 1, 2005).

Anonymous, "Top 10 Strangest Cell Phones," online discussion, http://www.techeblog.com/index.php/tech-gadget/top-10-strangest-cell-phones, TechEBlog.com (printed Sep. 27, 2006).

Anonymous, "Tvse Case Studies", Product Information, http://www.telrad.co.uk/casetvse.html, Iridiacom Ltd. (printed Nov. 7, 2007).

Anonymous, "TVSe Server", Product Summary, http://www.telrad.co.uk/tvse.html, Iridiacom Ltd. (printed Nov. 7, 2007).

Anonymous, "UBISTAR World-Class Wireless Communications Professional Corporation", website, http://eng.ubistar.com/business/business07.asp (printed Nov. 7, 2007).

Anonymous, "uControl Launches New Home Security Service," online article, http://www.voipmonitor.net/uControl+Launches+New+Home+Security+Service.aspx, VoIPMonitor.net (Sep. 26, 2006).

Anonymous, "UniBilling VoIP Billing Software", product summary, http://iaxtalk.com/index.php?main_page=product_info&cPath=11& products_id=27, iaxTalk.com (Mar. 19, 2007).

Anonymous, "USB VoIP Phone", Product Information, http://eng.ubistar.com/product/product10/product01.asp, UBISTAR Inc. (printed Nov. 7, 2007).

Anonymous, "VisiFone to Provide Personalized Content and a Rich Consumer Experience to the Growing VoIP Market," Press Release, http://www.viseon.com/n_printme.asp?newsID-2I3, Viseon, Inc. (Apr. 13, 2005).

Anonymous, "Vitaphone 1100 More safety and mobility in everyday life," Product Information, http://www.vitaphone.de/en/three_button_mobile_phone/vp_1100/ (printed Sep. 27, 2006).

Anonymous, "Vitaphone 1300 the Vitaphone 1300 (emergency mobile phone)," Product Information, http://www.vitaphone.de/en/emergency_mobile_phone/vitaphone_1300/ (printed Sep. 27, 2006).

Anonymous, "Voiceglo and Friendster Connect with Internet Phone Service; Popular Online Service Will Offer VoIP to Millions of Members Worldwide," Press Release, http://www.tmcnet.com/scripts/print-page.aspx? PagePrint=http%3a%2f%2fwww.tmcnet.com . . . Technology Marketing Corporation (Sep. 30, 2004).

Anonymous, "VoiceGlo Chooses Ciena/Laurel Solution to Support Rapidly Growing GloPhone Voice Over IP Service," Press Release, http://www.ciena.com/print/news_2784.htm, Ciena Corporation (Jun. 9, 2004).

Anonymous, "Voiceglo Equipment Options," Product Information, http://web.archive.org/web/20040208152443/www.voiceglo.com/pages/Products_equipment.html, theglobe.com, Inc. (Feb. 2004).

Anonymous, "Voiceglo Features and Equipment," Product Information, http://web.archive.org/web/20040208150828/www.voiceglo.com/pages/Products_Features.html, theglobe.com, Inc. (Feb. 2004).

Anonymous, "Voiceglo Features," Product Information, http://web.archive.org/web/20040415100920/voiceglo.com/features, theglobe.com, Inc. (Apr. 2004).

Anonymous, "Voiceglo," Product Information, http://web.archive.org/web/20031210080813/webphone.voiceglo.com/, theglobe.com, Inc. (2003).

Anonymous, "VoiceGlo," Product Information, http://www.voip-info.org/wiki/view/VoiceGlo, Arte Marketing, Inc. (Nov. 2, 2005).

Anonymous, "VoiceMaster® VoIP Billing", Product Overview, http://www.sysmaster.com/products/voip_billing.php, SysMaster Corporation (printed Nov. 8, 2007).

Anonymous, "VoicePulse VoIP Internet Phone Service", Product Summary, http://www.thetravelinsider.info/roadwarriorcontent/ voicepulsevoip.htm, The Travel Insider LLC (originally published Jun. 11, 2004; last updated Sep. 8, 2005).

Anonymous, "Voip . . . a Voice Over Internet Protocol Solution.", Product Summaries, https://www.ekovista.com/voip.php (printed Oct. 2, 2007).

Anonymous, "VoIP and Home Security Systems," Product Information, http://www.itbusinessedge.com/item/?ci=8057, NarrowCast Group, Inc. (Oct. 11, 2005).

Anonymous, "VoIP and Wireless: Destined to Converge", online article, http://www.advancedippipeline.com/shared/article/printabloeArticleSrc.jhtml?articleId=160 . . . , The Associated Press (Apr. 20, 2005).

Anonymous, "VoIP Billing: ISP / Carrier", Product Summary, http://www.vcentrix.net/voip_billing.html (printed Nov. 7, 2007).

Anonymous, "VOIP for home securit [sic] system?", online discussion, http://www.broadbandreports.com/forum/remark,13167185, dsireports.com (Oct. 24, 2004).

Anonymous, "Vonage—The New Vonage V-Phone," Product Information, http://www.vonage.com/vonagevphone/#, Vonage Marketing Inc. (2006).

Anonymous, "Vonage and Security System," online discussion, http://www.vonage-forum.com/ftopic987.html, Vonage VoIP Forum (May 13, 2004).

Anonymous, "Vonage Digital Voice", product summary, http://web.archvie.org/web/20021006070603/www.vonage.com/digitalvoice/ourtechnology.phtml, Vonage Holdings Corp. (2002).

Anonymous, "Vonage Reaches Major Milestone With Its First Technology Patent", Press Release, http://www.marketwatch.com/news/story/vonage-reaches-major-milestone-its/story.aspx?guid=%7BB&A . . . , PRNewswire (Jul. 10, 2008).

Anonymous, "VONAGE® Releases Xten®'s X-PRO SoftPhone for Mac OS X", Press Release (Jun. 21, 2004).

Anonymous, "Vonage® Selects Xten's X-Pro As The 'Softphone of Choice' ", Press Release, http://www.vonage-forum.com/article757.html, 4Sight Media LLC (Mar. 23, 2004).

Anonymous, "Web-Based Platforms with VoIP Components Seen Providing Telcos With Opportunities, Challenges", online article, http://www.tr.com/tronline/tr/2005/tr100105/tr100105.htm?print=YES, Telecommunications Reports International, Inc. (Oct. 1, 2005).

Anonymous, "Welcome to SmartMonitoring online", Product Information, http://www.smartmonitoring.com/, RGS Technologies (printed Sep. 27, 2006).

Anonymous, "Welcome to the SIPWiki!", Product/Company Information, http://www.toyz.org/cgi-bin/sipwiki.cgi (Oct. 23, 2007).

Anonymous, "What is voiceglo?," Product Information, http://web.archive.org/web/20040208143232/www.voiceglo.com/pages/whatisvg.html, theglobe.com, Inc. (Feb. 2004).

Anonymous, "White Papers", Company Information, http://www.quorumsystems.com/products/white_papers.html, Quorum Systems, Inc. (printed Apr. 7, 2005).

Anonymous, "With Safe Watch CellGuard® for VoIP, You Can Be Connected," Product Information, http://www.adt.com/resi/system_packages/VOIP/how_can_work/, ADT Security Services, Inc. (printed Oct. 10, 2006).

Anonymous, "Xten Networks New X-Lite SoftPhone Integrated with pulver.com's Free World Dialup", Press Release, http://web.archive.org/web/20040402130512/www.xten.com/index.php?menu=company&smenu=news, PRNewswire (Jun. 9, 2003).

Anonymous, "Xten Releases X-PRO, New SIP Softphone for VoIP Communications", Press Release, PRNewswire (Apr. 16, 2003).

Anonymous, i2 Telecom home web page, http://web.archive.org/web/20031014121110/http://www.i2telecom.com/index.html, i2 Telecom (Oct. 2003).

Anonymous, product image of Clarisys phone at http://us.st11.yimg.com/store1.yimg.com/I/ahernstore_1885_6299667 (printed Feb. 27, 2006).

Baker, "Behavioral Targeting and Contextual Advertising," online article, http://www.searchenginejournal.com/behavioral-targeting-and-contextual-advertising/836/, Search Engine Journal (Sep. 1, 2004).

Barnard, "VoIP Technology Firm i2Telecom Stands Ready to protect its VoiceStick Patent", online article, http://voipservices.tmcnet.com/feature/articles/13573-voip-technology-firm-i2telecom-stands-ready-protect-its.htm, Technology Marketing Corporation (Oct. 31, 2007).

Cauley, "Skype: 'Locked' phones unfair", online article, http://www.usatoday.com/tech/wireless/phones/2007-06-05-skype-fcc_N.htm?POE=click-refer (Jun. 5, 2007).

Conk, "Nandi-capable Cell Phones for Those With Special Needs," online article, http://www.insiderreports.com/storypage.asp?ChanID=CW&DeptID=&StoryID=2000167 . . . , Horizons Unlimited Group (printed Sep. 27, 2006).

Cummings, "VoIP realities—as VoIp becomes an increasingly mainstream technology, users provde a reality check in terms of VoIP costs, features and problems.", online article, http://www.networkworld.com/cgi-bin/mailto/x.cgi?pagetosend=/export/home/httpd/htdocs/research/2004/101804 per . . . , Network World, Inc. (Oct. 18, 2004).

Davis, "FTC Town Hall Meeting Raises Questions on Regulation", online article, http://publications.mediapost.com/index.cfm?fuseaction=Articles.showArticleHomePage& . . . , MediaPost Communications (Nov. 5, 2007).

DeCarmo, "Security to Go", article originally published online in EMedia Magazine, Gale Document No. A67408252, Gale, Cengage Learning (Nov. 13, 2000).

Decker, "New Internet/Telecom Product/Technology Wanted", online discussion, http://groups.google.com/group/comp.dcom.telecom/browse_thread/thread/1227ba19866a3426/22f8ceae0 . . . (Sep. 22, 1995).

Desmond, "Surviving VoIP," online article, http://pcworld.com/printable/article/id,119783/printable.html, PC World (Feb. 23, 2005).

Erwin, "Appetite for intelligence: outdated Army training, education programs get revamped; INFORMATION WARFARE", *National Defense*, No. 619, vol. 89, p. 22, National Defense Industrial Association, Gale Group, Inc. (Jun. 1, 2005).

Francis, "Alarm Systems & VoIP (Voice over Internet Protocol) Phone Lines," online article, http://ezinearticles.com/?Alarm-Systems-and-VoIP-(Voice-over-Internet-Protocol)-Phone-Lines&id=53 . . . , Ezine @rticles (Jul. 24, 2005).

Gardner, "Another First for VoIP: Retail Stores", online article, http://www.crn.com/networking/18839987, CMP Media LLC (Oct. 9, 2003).

Gardner, "The Price Is Right for Challenger Mobile's Phone Platform: Free", online article, http://www.informationweek.com/news/mobility/voip/showArticlejhtml?articleID=202801699, Information Week (Nov. 2, 2007).

Glover, "Microsoft free internet voice service challenges Vodafone", online article, The Spectator, Business Section (Feb. 19, 2006).

Harbert, "Portable memory, without the baggage", abstract of online article from *Electronic Business*, vol. 30, Issue 5, the H.W. Wilson Company (May 2004).

Hardy, "The Pocket Loox 700 Series Revealed", online article, http://.www.brighthand.com/printArticle.asp?newsid=10502 (Jul. 2, 2004).

Hibbard, "VOIP Fledgling in Founders Flap", online article, http://www.lightreading.com/document.asp?doc_id=51585&print=true, *Light Reading*, CMP Media LLC (Apr. 23, 2004).

Hogan, "Soft Spot—Software that turns your wi-fi connection into a 'phone line'? You bet, and it could save you big bucks.", online article, http://www.entrepreneur.com/article/printthis/69270.html, Entrepreneur.com (Mar. 2004).

International Search Report, International Application No. PCT/US2007/003915 (WO 2007/095291) (Nov. 26, 2007).

International Search Report, International Application No. PCT/US2008/59156 (WO 2008/124447), Jun. 27, 2008.

International Search Report, International Application No. PCT/US2008/64790 (WO 2008/148061), Sep. 4, 2008.

International Search Report, International Application No. PCT/US2009/34567, May 28, 2009.

Jacobi, "Voiceglo," Product Information, http://reviews.cnet.com/voip/voiceglo/4514-9238_7-30974764.html?tag=tool, CNET (Jul. 16, 2004).

Jaques, "Boingo and Vonage talk up wireless VoIP", online article, http://msn.vnunet.com/articles/print/2126026, Incisive Media Ltd. (Oct. 19, 2004).

Keating, "i2Telecom InternetTalker MG-3", posting on VoIP & Gadgets Blog, http://blog.tmcnet.com/blog/tom-keating/voip/i2telecom-internettalker-mg3.asp (Oct. 15, 2004).

Keating, "Voiceglo sweepstakes to win 'one of this year's hottest cars,'" online discussion, http://blog.tmcnet.com/blog/tom-keating/skype/voiceglo-sweepstakes-to-win-one-of-this-years-hottest-cars.asp, Technology Marketing Corporation (Jul. 22, 2004).

Keating, "Voiceglo VoIP Surpasses More Than 1.8 Million Users,", online discussion, http://blog.tmcnet.com/blog/tom-keating/voip/voiceglo-voip-surpasses-more-than-18-mil lion-users.asp, Technology Marketing Corporation (Oct. 20, 2004).

Kohl (ed.), "The VoIP Challenge for Alarm Systems Dealers," online article, http://www.securityinfowatch.com/article/printer.jsp?id=2538, SecurityInfoWatch.com (Feb. 23, 2005).

Kotov, "Review PDA Fujitsu Siemens Pocket LOOX 710", Product Review, http://www.mobile-review.com/pda/review/fs-loox710-en.shtml, Mobile-review.com (Feb. 1, 2005).

Lamberg, "Vonage offers an alternative to traditional phones service", online article, http://web.archive.org/web/20030404105306/www.vonage.com/corporate/news/060602.html (Jun. 6, 2002).

Libbenga, "CeBIT 2004: Gadgets galore," online article, http://www.theregister.co.uk/2004/03/18/cebit_2004_gadgets_galore/print/html, The Register (Mar. 18, 2004).

Malik, "Doubts raised over Verizon VoIP patents", online discussion, http://gigaom.com/2007/04/16/will-vonage-get-a-lifeline/ (Apr. 17, 2007).

Malik, "End of the ATA", online discussion, The GigaOm Network (Mar. 13, 2005).

Meyer, "Report: Sprint developing combined Wi-Fi/PCS service", online article, http://www.rcrnews.com/printwindow.cms?newsId=22108&pageType=news, Crain Communications Inc. (Apr. 6, 2005).

Miller, "Future calling—A voice-over broadband hands-on", online article, http://www.edn.com/index.asp?layout=article&articleid=CA254189, Reed Business Information (Oct. 23, 2002).

Mills, "Google mobile ads patent", online article, http://news.cnet.com/8301-10784_3-6024840-7.html, CBS Interactive Inc. (Jan. 9, 2006).

Mills, "It's the Net's Best Thing to Being There; With Right Software, Computer Becomes a Toll-Free Telephone", newspaper article, The Washington Post, Financial Section, p. C01 (Jan. 23, 1996).

Mossberg, "Next Generation Internet Phone Calls", online video review, http://online.wsj.com/page/8_0006.html?bclid=86272812&bctid=1119297376&mod=hps_us_video_promo, The Wall Street Journal Online (printed Oct. 6, 2008).

Murph, "Microsoft patents DVR application to provide targeted advertising," Product Information, http://www.engadget.com/2006/12/10/microsoft-patents-dvr-application-to-provide-targeted-advertisin/, Weblogs, Inc. (Dec. 10, 2006).

Musgrove et al., "Gates Sees 2006 as the Year for 'The Digital Lifestyle'", article, The Washington Post, Business Section, p. D5 (Jan. 5, 2006).

Pogue, David, "Internet Calls Untethered From Your PC," online article, http://www.nytimes.com/2006/04/06/technology/06pogue.html?ei=5070&en=d284f633calfb282&ex=1144987200&emc=et al&pagewanted=all, The New York Times (Apr. 6, 2006).

Price, "Google Awarded Patent to Make Data Move Faster to Wireless Phones and Devices", online discussion, http://blog.searchenginewatch.com/blog/060103-220313, Incisive Interactive Marketing LLC (Jan. 3, 2006).

Price, "Yahoo Will Launch VoIP Service & Google Planning GoogleNet With Free Wi-Fi?," online discussion, http://blog.searchenginewatch.com/blog/050815-201830, Incisive Interactive Marketing LLC (Aug. 15, 2005).

Pulver, "Free World Dialup: Quick Start Guide", online article, http://web.archive.org/web/20031203053146/pulver.com/fwd/quick/, Free World Dialup LLC (Sep. 20, 2003).

Reardon, "VoIP goes Hollywood", online article, CNET NewsBlog (Jul. 19, 2007).

Reardon, "You might think kids are too young for cell phones, but your mobile operator doesn't . . . ", online article, http://m.news.com/Protective+parents+Gold+for+cellular+services/2163-1039_3-6058756 . . . , CNET Networks, Inc. (Apr. 7, 2006).

Ribeiro-Neto et al, "Impedance Coupling in Content-targeted Advertising," SIGIR '05, Salvador, Brazil (Aug. 15-19, 2005).

Rogers, "Google Phone patent?", online discussion, http://blogs.zdnet.com/Google/?p=501: (Mar. 9, 2007).

Segan, "Chinese Companies Invade Cell-Phone Market", online article, http://www.pcmag.com/print_article2/0,2533,a=142236,00.asp, Ziff Davis Media Inc. (Jan. 7, 2005).

Segan, "Samsung Focuses on Speed and Style With 2006 Phones", online article, http://abcnews.go.com/Technology/print?id=1473800, Ziff Davis Media Inc. (Jan. 4, 2006).

Sharma et al., "Vonage Phone Device to Target Business Travelers", online article, http://online.wsj.com/article/SB115144480536192271.html?mod=todays_us_marketplace, Dow Jones Company, Inc. (Jun. 28, 2006).

Sharma et al., "Vonage to Unveil Plug-In, Allowing Internet Calling", online article, The Wall Street Journal (Jun. 28, 2006).

Shaw, "EXCLUSIVE: 1995 Newsgroup posting proposing VoIP predates Verizon, Sprint patents", online article, http://blogs.zdnet.com/ip-telephony/?p=1550, CNET Networks, Inc. (Apr. 19, 2007).

Shaw, "EXCLUSIVE: Here's the Patent AT&T is suing Vonage over", online discussion, http://blogs.zdnet.com/ip-telephony/?p=2615, CNET Networks, Inc. (Oct. 20, 2007).

Shaw, "Plantronics offers USB wireless headset", online article under the "Cool Tools" column, http://www.networkworld.com/cgi-bin/mailto/x.cgi?pagetosend=/export/home/httpd/htdocs/columnists/2004/101104 . . . , Network World, Inc. (Oct. 11, 2004).

Slawski, "The future of ads on phones?", online discussion, http://www.seobythesea.com/?p=88 (Jan. 5, 2006).

Svensson, "Review: Wi-Fi Calling Needs Development", online article, http://www.tmcnet.com/scripts/print-page.aspx?PagePrint=http%3a%2f%2fwww.tmcnet.com%2fnews%2f2006%2f03%2f22%2f1481633.htm, Technology Marketing Corporation (Mar. 22, 2006).

Sylvers, "Ads targeting cellphone's location", online article, http://www.iht.com/articles/2007/11/02/technology/WIRELESS05.php, the International Herald Tribune (Nov. 4, 2007).

Teal, "Get IP-Rich Quick—Low-Cost Appliances Speed Path to VoIP Benefits", online article, http://www.phoneplusmag.com/articles/511onpremises4.html, Virgo Publishing (Nov. 1, 2005).

Van, "Firm offers telephone service via broadband", newspaper article, Chicago Tribune Company, Business section, p. 2 (Sep. 2, 2002).

Vittore, "Covering All Bets", online article, http://telephonyonline.com/mag/telecom_future_seen_technology_39/, Penton Media, Inc. (Jan. 12, 2004).

Wheelwright, "The perfect solution, but what is the problem?", Financial Times, Telecomms Focus, p. 2, The Financial Times Limited (Jun. 18, 2003).

Williamson, "UNC-CH computer expert receives patent for device that summons emergency help," Press Release, http://www.unc.edu/news/archives/feb01/vicci020801.htm, UNC News Services (Feb. 6, 2001).

Young, "Web Phones Go Unplugged", news article, the Wall Street Journal, p. B1 (Jan. 12, 2006).

International Search Report mailed on Jun. 9, 2010, in international application No. PCT/US2010/022124.

Written Opinion of the International Searching Authority issued on Jul. 27, 2011, in international application No. PCT/US2010/022124.

Written Opinion of the International Searching Authority issued on Aug. 15, 2008, in international application No. PCT/US2007/003915.

Written Opinion of the International Searching Authority issued on Oct. 3, 2009, in international application No. PCT/US2008/59156.

Written Opinion of the International Searching Authority issued on Nov. 24, 2009, in international application No. PCT/US2008/064790.

Written Opinion of the International Searching Authority issued on Aug. 20, 2010, in international application No. PCT/US2009/034567.

* cited by examiner

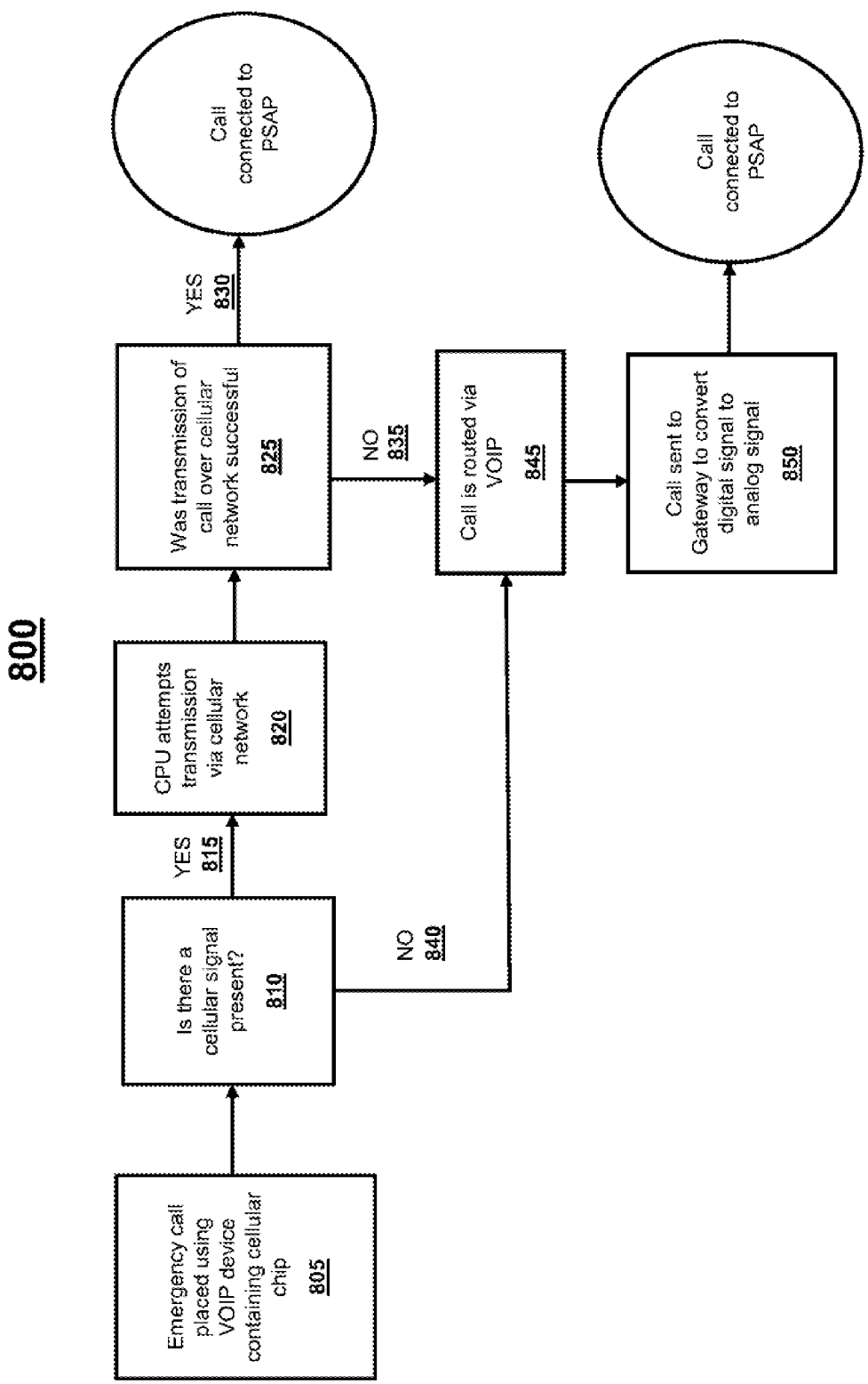

COMMUNICATION DEVICE LOCATION ESTIMATION
  ESTIMATED LOCATION :: LAT=37.386168, LON=-121.990818

BSS A# [T-MOBILE] :: PWR= -52 dbm, LAT=37.384004, LON=-121.987324
  BSS B# [AT&T] :: PWR= -58 dbm, LAT=37.387768, LON=-121.984066
  BSS C# [T-MOBILE] :: PWR= -58 dbm, LAT=37.392028, LON=-121.992814
  BSS D# [AT&T] :: PWR= -61 dbm, LAT=37.390836, LON=-121.995128       CELL TOWER INFORMATION
  BSS E [AT&T] :: PWR= -68 dbm, LAT=37.387549, LON=-121.984961        CARRIER POWER LAT/LOG
  BSS F# [T-MOBILE] :: PWR= -67 dbm, LAT=37.374778, LON=-121.996334
  BSS G [AT&T] :: PWR= -68 dbm, LAT=37.383238, LON=-121.985941
  BSS H [AT&T] :: PWR= -65 dbm, LAT=37.386658, LON=-121.983228
  BSS I [AT&T] :: PWR= -61 dbm, LAT=37.390637, LON=-121.994473

===> ESTIMATED ADDRESS = 1290-1298 OAKMEAD PKWY, SUNNYVALE, CA 94085, USA
===> ACTUAL ADDRESS = 1270 OAKMEAD PARKWAY, SUNNYVALE, CA, USA
===> ACUTAL COORDINATION :: LAT=37.3868616, LON=-121.9917771
===> DISTANCE FROM KNOWN POINT= 114.71 METERS
THIS PAGE SHOWS MAGICJACK LOCATION ESTIMATION RESULT.
⊛ "BLUE DOT" DENOTES THE DEVICE'S ESTIMATED LOCATION.
⊘ "GREEN HOUSE" DENOTES THE DEVICE'S ACTUAL LOCATION.
⊙ "RED DOTS" DENOTE THE NEIGHBORING GSM BASE STATION TOWERS.

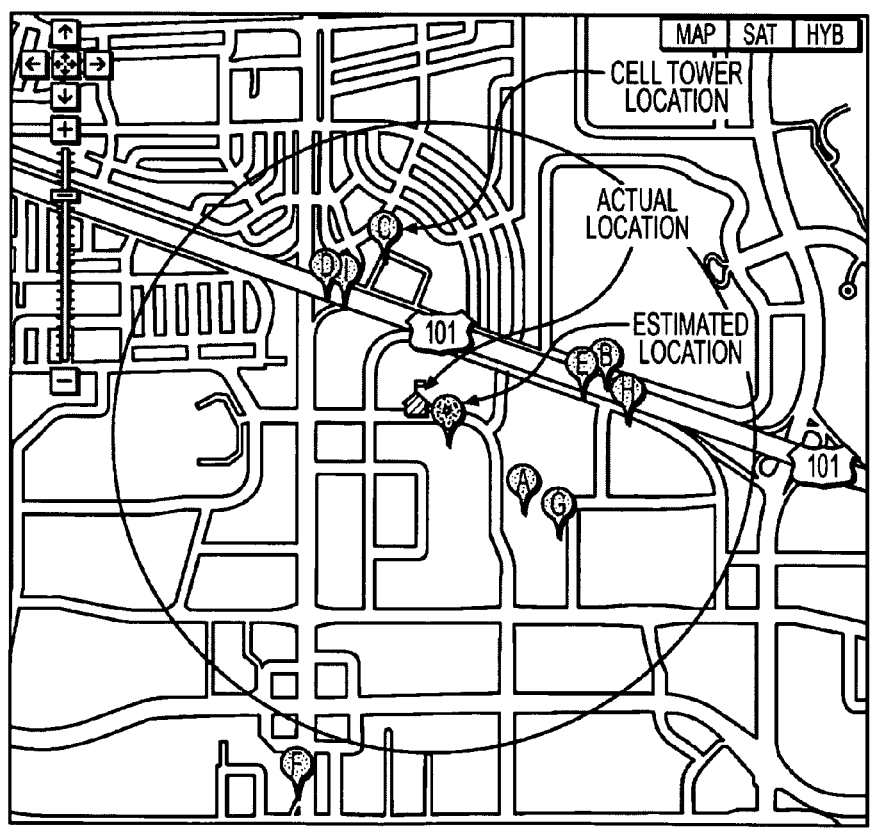

Fig. 9(b)

COMPUTER-RELATED DEVICES AND TECHNIQUES FOR FACILITATING AN EMERGENCY CALL VIA A CELLULAR OR DATA NETWORK USING REMOTE COMMUNICATION DEVICE IDENTIFYING INFORMATION

FIELD OF THE INVENTION

This invention is applicable at least in the fields of voice and data communications (e.g., those that implement Voice over Internet Protocol (VoIP) communications) and the field of cellular telephony and, more particularly, in the field of devices, systems, processor program products, and methods of facilitating emergency calls. The invention may be applicable, for example, in systems interfacing a standard telephone to a data network (e.g., a VoIP compatible communication network) via, for example, a computer system, which may facilitate communication over the data network via, for example, a local area network, wide area network, and/or over an existing wireless network.

BACKGROUND OF THE INVENTION

VoIP is a technology that allows the systems and transmission channels that connect computer networks to act as an alternative to phone lines, delivering real-time voice to both standard telephones and personal computers (PCs). VoIP allows an individual to utilize a network connection to transmit voice encapsulated data packets over available local communication lines, such as the Internet. This is typically facilitated by the use of an Analog Telephone Adapter (ATA) which emulates some functions of a phone company's central office and connects via a wired interface to a network like the Internet.

In a VoIP system, the analog voice signal is typically picked up by a microphone and sent to an audio processor within a personal computer.

VoIP converts standard telephone voice signals into compressed data packets that can be sent locally over an Ethernet or globally via an ISP's data networks rather than traditional phone lines.

One of the main difficulties with using VoIP is that it is difficult to facilitate the handling of emergency calls, e.g., emergency "911" calls via systems that implement a VoIP connection. This is especially true when VoIP connections are initiated from mobile or nomadic devices. It is important to determine where an emergency call is being initiated from so that emergency personnel can address the emergency which gave rise to the emergency call. The present invention solves these and other problems involved in the current state of the art, as will be explained below.

SUMMARY OF THE INVENTION

The present invention is best understood with reference to the claims, the entire specification, and all of the drawings submitted herewith, which describe the devices, systems, processor program products and methods of the present invention in greater detail than this summary, which is merely intended to convey aspects of illustrative embodiments of the present invention. By way of example, the disclosed devices (e.g., computers and adapters, such as network adapters), systems, processor program products and methods may include a combination of hardware and/or software which allows the user to overcome problems associated with making emergency calls on a VoIP communications network. Also by way of example, the central processing unit(s), processor(s), controller(s) or control logic in the disclosed devices (e.g., the computers and adapters) can include the ability to route, via a transceiver for example, emergency calls to a commercial mobile radio service ("CMRS") or cellular transmitter over a CMRS network to facilitate the handling of emergency calls, such as emergency "911" calls. Alternatively, an emergency call may be placed over the VoIP network. By way of example, if a transmission is not possible, or is attempted and fails for any reason, then the emergency call may be placed over the VoIP network. Also by way of example, if the system cannot detect a cellular signal, or if a cellular signal is detected but transmission of the call over the cellular network fails, then the emergency call will be placed over the VoIP network. Or it may be determined that placing the emergency call over the VoIP network has other advantages and so that transmission medium is chosen.

In accordance with an exemplary embodiment of the present invention, a communication device is provided for use with a computer. The communication device includes a transceiver and control logic. The control logic (a) receives one or more first signals carrying corresponding one or more remote communication device identifiers (e.g., cellular tower identifiers or wireless access point identifiers) that each identify one or more remote communication devices, (b) determines one or more signal strengths of the one or more first signals and a location of the communication device based on the one or more remote communication device identifiers (or one or more locations of the one or more remote communication devices) and the one or more signal strengths of said first signals, (c) receives a second signal corresponding to an emergency call, and (d) transfers, via a cellular network or a packet switched network, a third signal carrying an indicator of the location of said communication device to a remote device to aid emergency personnel in identifying the location of said communication device, said control logic implementing said emergency call as one of a cellular-based call via said cellular network and a VoIP call via said packet switched network.

In accordance with the exemplary embodiment, the control logic may output a fourth signal carrying the one or more cellular tower identifiers and receives a fifth signal carrying one or more locations of the cellular towers having the one or more cellular tower identifiers, wherein said control logic determines a location of the communication device using the one or more locations of the cellular towers and the one or more signal strengths of the one or more first signals. In addition, the location of the communication device may be used to update registered location information of the communication device automatically or manually. By way of example, if the update is done manually, a user of the communication device may be prompted to update the registered location information of the communication device using the determined location of the communication device. The above-mentioned indicator is then selected from the registered location information of the communication device. However, the updating of registered location information need not be done incident to the handling of an emergency call, but may be done in advance to facilitate timely updates to the registered location information that may be stored in memory associated with the communication device or some other device coupled thereto.

The systems and methods disclosed herein also allow the communication devices (e.g., the computers and adapters) to determine their location and connect to a network (e.g., packet switched network or cellular network) to provide location information to emergency personnel. Thus, additional freedom and functionality are provided to the user, as described in more detail below. With regard to cellular networks, communication devices can also be configured to transmit information over a broadband cellular link, such as EV-DO or other similar types of networks.

Additional objects, advantages and novel features of this invention will be set forth in part in the description that follows, and in part will become apparent to those skilled in the art upon examination of the following description, or may be learned by practicing the invention.

BRIEF DESCRIPTION OF THE DRAWINGS

In the accompanying drawings that form a part of the specification and are to be read in conjunction therewith, the present invention is illustrated by way of example and not limitation, with like reference numerals referring to like elements, wherein:

FIG. 8 is a flow chart illustrating the process of making an emergency call, according to an embodiment of the invention.

FIG. 9(b) depicts the actual and estimated positions of different components within a cellular network and signal strength information for cellular communications pertinent to an exemplary embodiment of the present invention.

DETAILED DESCRIPTION OF THE INVENTION

In the following detailed description, numerous specific details are set forth in order to provide a thorough understanding of the invention. In other instances, well known structures, interfaces, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention.

Figure 1A:
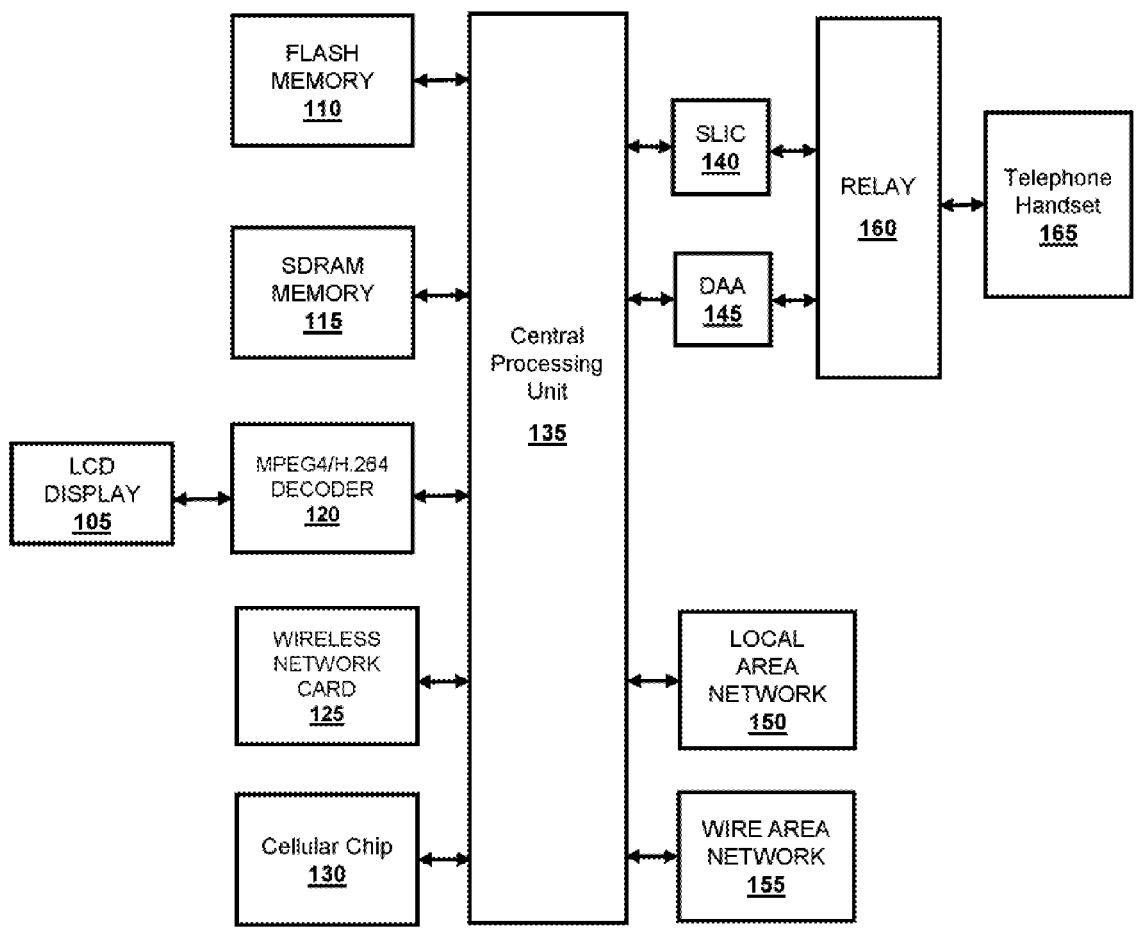
FIGS. 1(a) and 1(b) illustrate an adapter, according to an embodiment of the invention.

FIG. 1(a) illustrates the components of a particular device, which is an adapter 100, such as a network adapter, according to an embodiment of the invention. However, these components may be employed in a number of other systems and devices of the present invention. By way of the example, the components described in connection with the adapter 100 and the manner in which they are employed may be the same for other devices, including telephones (e.g., cellular phones) and computers. Accordingly, the description of the adapter 100 set forth herein and reflected in the drawings may be read more broadly as merely an example of the types of features that other devices, such as telephones and computers, may have that implement the present invention. In some instances, the components of the adapter may be incorporated in a computer, and so no separate adapter may be required.

The adapter 100 includes a central processing unit 135 connected to the relay 160 via the subscriber line interface (SLIC) 140 and the DAA 145. The relay 160 is used to isolate and bridge an analog telephone handset 165 to the adapter 100. In some instances, a digital telephone handset may be employed. In addition, a separate handset may not be required if a headset, microphone, and/or speakers of a computer are employed.

As stated above, the adapter 100 includes a SLIC 140 and a data access arrangement (DAA) circuit 145. The SLIC 140 is responsible for emulating a central office. It generates a ring current, detects on-hook and off-hook transition and notifies the central processing unit (CPU) 135 of any signal transition. The SLIC 140 also performs A/D conversion on input voice signal and may also perform D/A conversion on voice signal to be processed by the telephone handset 165. The DAA 145 detects a ring current and notifies the CPU 135 of the presence of a ring current. The DAA 145 also creates off-hook and on-hook transactions in order to emulate a telephone handset back to the phone company's central office, and it also performs A/D and/or D/A conversion on signals transmitting to and from the equivalent of a central office (not shown).

The CPU 135 controls the adapter 100 via programmable software. The CPU 135 is a microprocessor, of a kind that is well known to one of ordinary skill in the art. Integrated into the CPU 135 is digital signal processor software (not shown) which processes voice signal data in real time.

Connected to the CPU 135 may be several memory devices such as flash memory 110 and SDRAM 115. The flash memory 110 may be used to store information permanently, such as configuration information and program code, when the adapter 100 is turned off. The SDRAM 115 may be used as a working storage for the CPU 135 during operation. The MPEG-4/H.264 decoder 120 is an integrated circuit that is responsible for producing video output from the CPU 135 to the optional LCD display 105. The MPEG-4/H.264 decoder 120 decodes streaming video information received via the wide area network connection 155 via the CPU 135. One of ordinary skill in the art can appreciate that any kind of decoder, such as, for example, an MPEG-4/H.264 decoder, can be used to decode the video output, if any.

The LCD display 105, which is an optional feature of the adapter 100, is used to display information about the incoming call and diagnostic and status information of the adapter 100. The LCD display 105 can also be used to display and present advertising and/or entertainment to the user. In an alternative embodiment of the invention, the CPU 135 includes circuitry which monitors the signal strength of the wireless network (not shown) employed by the adapter 100. The signal strength monitoring circuitry is well known to one of ordinary skill in the art. The MPEG-4/H.264 decoder 120 receives this information from the CPU 135 in real-time and transfers this information to the LCD display 105. The LCD display 105 receives the signal strength information and displays it to the user in a known manner. Accordingly, the user can monitor the signal strength as displayed on the LCD display 105 and manually adjust the location of the adapter 100 in order to maximize the signal strength. In further embodiments, the LCD display 105 can show information regarding the strength of the cellular network that is received from CPU 135. In one embodiment, the LCD display 105 can show the signal strength of the cellular network.

In one embodiment, a wireless network card 125 is connected to the CPU 135. The wireless network card 125 may be connected to the CPU 135 via a mini-PCI connector (not shown). Also, the wireless network capability may be built in to the adapter 100 in the form of a semiconductor chip without the use of a separate card. The wireless network card 125 allows the adapter 100 to access any one or more of available wireless networks. The wireless network card 125 can transmit the information to the network by implementing a variation of the IEEE 802.11 standard. One of ordinary skill, however, can appreciate that other methods can be employed as well. The wireless network card 125 is built into the adapter 100 via a replaceable module via a known standard such as PCI, PCMCIA, or USB. By employing a particular wireless card, a user can have access to any number of wireless networks such as Wi-Fi, Wi-Max, EV-DO, HSPDA, and any other wireless network for which a mini-PCI card has been developed.

One of ordinary skill in the art can appreciate that the adapter 100 requires AC or DC power in order to operate. By way of example and not limitation, the adapter can be powered from an AC electrical outlet or DC power source, such as the cigarette lighter in an automobile, a DC battery, or the USB port of a computer.

In yet another embodiment of the invention, the adapter 100 can be adapted to include multiple wireless network cards. The multiple wireless network cards feature would allow the user flexibility to employ different types of wireless network services, such as Wi-Fi and cellular broadband wireless. One of ordinary skill can appreciate that many different services can be employed and the example is used for illustration and not as a way of limitation. The circuitry would be adapted to include a mini-PCI card and another mini-PCI card or other replaceable module, such as PCMCIA, USB or PCI. The CPU 135 would include software which would allow the network interface to adaptively switch between using the wireless network cards to transmit a voice signal and allow a user to replace wireless network cards during the operation of the adapter 100. For example, when the adapter 100 is not in range of the router 235 via Wi-Fi or other wireless network, the adapter 100 would transmit the packetized voice signal from the phone via a broadband cellular network like EV-DO or another applicable cellular broadband network to which the user has a subscription.

The adapter 100 has the capability to be attached to a local area network 150 to communicate with users on laptop or desktop personal computers and a wide area/broadband network 155 for communicating over a packet switched network, such as the Internet. Typically, the adapter has one or more RJ-11 jacks to connect with a telephone, and at least one RJ-45 connection to a 10/100BaseT Ethernet Hub or switch to connect to the local area network 150. Alternatively, the adapter 100 may be attached directly to a laptop or desktop personal computer via, for example, a USB connection.

Also connected to the CPU 135 is a cellular chip 130 implementing a transceiver which allows the adapter 100 to access a cellular network. The cellular chip 130 may be connected to the CPU 135 or it may be integrated with the CPU 135 on a circuit (with or without other components). The cellular chip 130 may receive voice data from the CPU 135 and modulates and transmits the data in a known way to communicate with another user via the cellular network. The cellular chip 130 functions in a duplex manner to allow voice conversations over the cellular network.

The CPU 135 and/or cellular chip 130 monitors signals received from one or more cell towers to determine their cell tower identifiers and also monitor the corresponding signal strength for each of those signals using the above-mentioned signal strength monitoring circuitry. The cell tower identifiers and corresponding signal strengths are stored in local flash memory (e.g., memory 110 and SDRAM 115). In accordance with one embodiment, the CPU 135 will then query a database system (e.g., such as that which is provided by Mexens Technology via web service APIs which are offered as part of its NAVIZON positioning system) via an associated computer and its broadband link to identify a latitude and longitude for each cell tower, and thereafter use the latitude and longitude and the signal strength for each cell tower to calculate a location for the adapter 100 using well-known triangulation techniques. See U.S. Pat. No. 7,397,424, which is incorporated herein by reference. Alternatively, the CPU 135 may query a database system with the latitude and longitude of each cell tower along with its corresponding signal strength and have the database system return location identifying information for the adapter 100, such as a calculated location of the adapter 100 expressed in the form of latitude and longitude coordinates.

Once the location identifying information, such as latitude and longitude coordinates, have been determined, a database system, such as Google maps may be queried by the CPU 135 (via an associated computer and its broadband link) using Google maps APIs to identify the corresponding closest address (or other location identifying information) for the adapter 100 based on the given latitude and longitude. The CPU 135 may then cause the display 105 to display location identifying information for the adapter 100, including the address information received from Google maps database system.

Once the CPU 135 determines a location of the adapter 100, it may, in connection with the handling of an emergency call, transfer, via a cellular network or a packet switched network, location identifying information to a remote device (such as a computer operated by a PSAP) to aid emergency personnel in identifying the location of said communication device. The CPU 135 may implement said emergency call as a cellular-based call via said cellular network using the cellular chip 130 or a VoIP call via said packet switched network. By way of example, the CPU 135 may use the routing techniques described below in order to route the call using the cellular network or the packet switched network in the manner described below.

In accordance with one embodiment of the present invention, location identifying information may be provided to Intrado Inc., a location based service which maintains a database of registered locations for the adapter 100. The Intrado service, in turn, may provide the location identifying information directly to a PSAP. Although the Intrado service may receive location identifying information in the form of an address, it can also convert the location information from latitude and longitude to address information and forward the same to the PSAP.

In accordance with one embodiment of the present invention, the location identifying information that is forwarded to the PSAP (or to another location based service) in connection with the handling of an emergency call will be either a registered location that is closest to the calculated location of the adapter 100, or closest to the calculated location if it is within a predetermined distance from the registered location. The CPU 135 may store registered location information in local memory and evaluate the calculated location of the adapter 100 relative to the registered location information in local memory to identify the closest registered location to the location of the adapter 100, and whether the calculated location and the registered location are within a predetermined distance of each other. The registered location information may include one or more registered locations. If the calculated location of the adapter 100 is not a registered location or within a certain distance of a registered location, the CPU 135 may update the registered location to the calculated location, or may prompt a user to update the registered location information by noting the discrepancy between the calculated location and the registered location and, by way of example, selecting the most current calculated location of the adapter 100 as a suggested new registered location. The CPU 135 may display a prompt for the user to update the registered location on the display 105. The user may select the calculated location of the adapter 100 by selecting a particular key on a keyboard of the handset 135 or of the computer. The CPU 135 may cause the location to be displayed on the display 105 to aid the user in selecting the current calculated location of the adapter 100 as a registered location.

Although the operation of the CPU 135 of the adapter 100 has been described above, it may be that one or more of each of the operations described above may be performed by the CPU of another device, such as a computer that is coupled to the adapter 100.

In an embodiment of the invention, the CPU 135 may execute software that routes emergency calls to the cellular chip 130 which establishes a two-way communication channel corresponding to the emergency call, the two-way communication channel being established over a cellular network. Specifically, in one embodiment, if the CPU 135 determines that the cellular chip 130 can engage in two-way communication via the cellular network, then the CPU 135 proceeds to route the call over a cellular network via the cellular chip. By way of example, the CPU 135 may determine that the cellular chip 130 can engage in two-way communication via the cellular network by determining if a cellular signal is present. In an alternative embodiment, the CPU 135 may determine that the cellular chip 130 can engage in two-way communication via the cellular network by measuring the strength of a cellular signal and comparing it to a pre-determined standard. If the CPU determines that the cellular chip 130 can not engage in two-way communication via the cellular network, then the CPU 135 proceeds to route the call over the VoIP network. In another embodiment, the CPU attempts to route the call over a cellular network, and if the attempt fails, then the CPU 135 proceeds to route the call over the VoIP network, via, for example, a router and/or broadband modem.

Figure 1B:
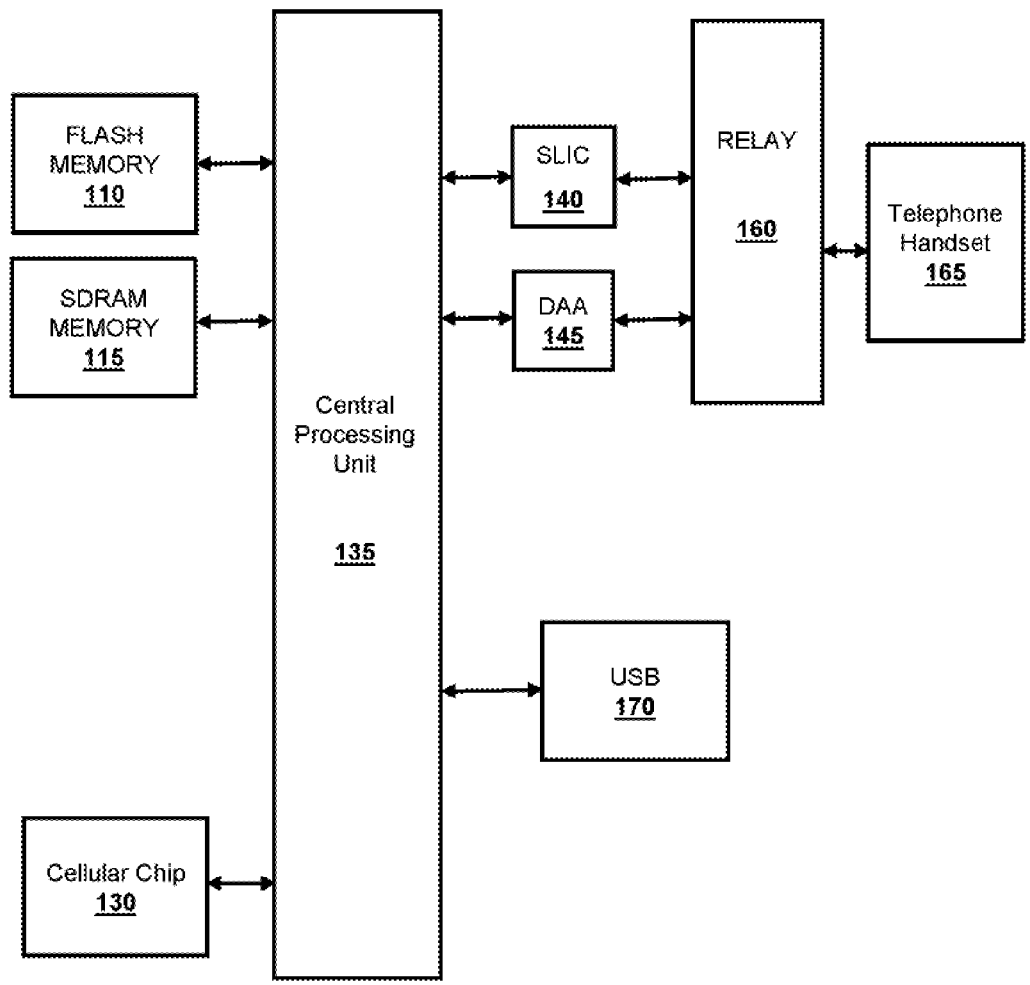

FIG. 1(b) illustrates one example of the components of a device, which is an adapter 100, such as a network adapter, according to a preferred embodiment of the invention. Again, these components may be employed in a number of other systems and devices of the present invention.

The adapter 100 includes a central processing unit 135 connected to the relay 160 via subscriber line interface (SLIC) 140 and the DAA 145. The relay 160 is used to isolate and bridge an analog telephone handset (165) to the adaptor 100. In some instances, a digital telephone handset may be employed. In addition, a separate handset may not be required if a headset, microphone, and/or speakers of a computer are employed.

The adapter 100 includes a subscriber line interface (SLIC) 140 and a data access arrangement (DAA) circuit 145. The SLIC 140 is responsible for emulating a central office. It generates a ring current, detects on-hook and off-hook transition and notifies the central processing unit (CPU) 135 of any signal transition. The SLIC 140 also performs A/D conversion on input voice signal and may also perform D/A conversion on voice signal to be processed by the telephone handset (165). The DAA 145 detects a ring current and notifies the CPU 135 of the presence of a ring current. The DAA 145 also creates off-hook and on-hook transactions in order to emulate a telephone handset back to the phone company's central office, and it also performs A/D and/or D/A conversion on signals transmitting to and from the equivalent of a central office (not shown).

The CPU 135 controls the adapter 100 via programmable software. The CPU 135 is a microprocessor, of a kind that is well known to one of ordinary skill in the art. Integrated into the CPU 135 is digital signal processor software (not shown) which processes voice signal data in real time.

Connected to the CPU 135 are several memory devices, such as flash memory 110 and SDRAM 115. The flash memory 110 may be used to store information permanently, such as configuration information and program code, when the adapter 100 is turned off. The SDRAM 115 may be used as a working storage for the CPU 135 during operation. The adapter 100 may have the capability to be attached directly to a laptop or desktop personal computer via a USB connector 170.

Also connected to the CPU 135 is a cellular chip 130 implementing a transceiver which allows the adapter 100 to access a cellular network. The cellular chip 130 may be connected to the CPU 135 or it may be integrated with the CPU 135 on a circuit (with or without other components). The cellular chip 130 and/or CPU 135 monitor signals received from cellular towers, gathers cellular tower identifiers from these signals, determines signal strength, and upon receipt of the locations of cellular towers derived from the cellular tower identifiers, can calculate the local position of the adapter 100. The local position of the adapter 100 may be used to update the registered location of the adapter 100 and may be transferred to a PSAP to aid emergency personnel in identifying the location of the adapter 100. Although the local position (or registered location) of the adapter 100 may be forwarded to the PSAP via a cellular network, it may also be sent to the PSAP via a VoIP network. The cellular chip 130 receives voice data from the CPU 135 and modulates and transmits the data in a known way to communicate with another user via the cellular network. The cellular chip 130 functions in a duplex manner to allow voice conversations over the cellular network. In an embodiment of the invention, the CPU 135 may execute software that routes emergency calls to the cellular chip 130 which establishes a two-way communication channel corresponding to the emergency call, the two-way communication channel being established over a cellular network. Specifically, if the transceiver detects the presence of a cellular network, then the CPU 135 attempts to route the call over the cellular network. If not, then the CPU 135 proceeds to route the call over the VoIP network. Or if the transceiver detects the presence of a cellular network, but the attempt to route the call over the cellular network fails, then the CPU 135 proceeds to route the call over the VoIP network.

Figure 2:
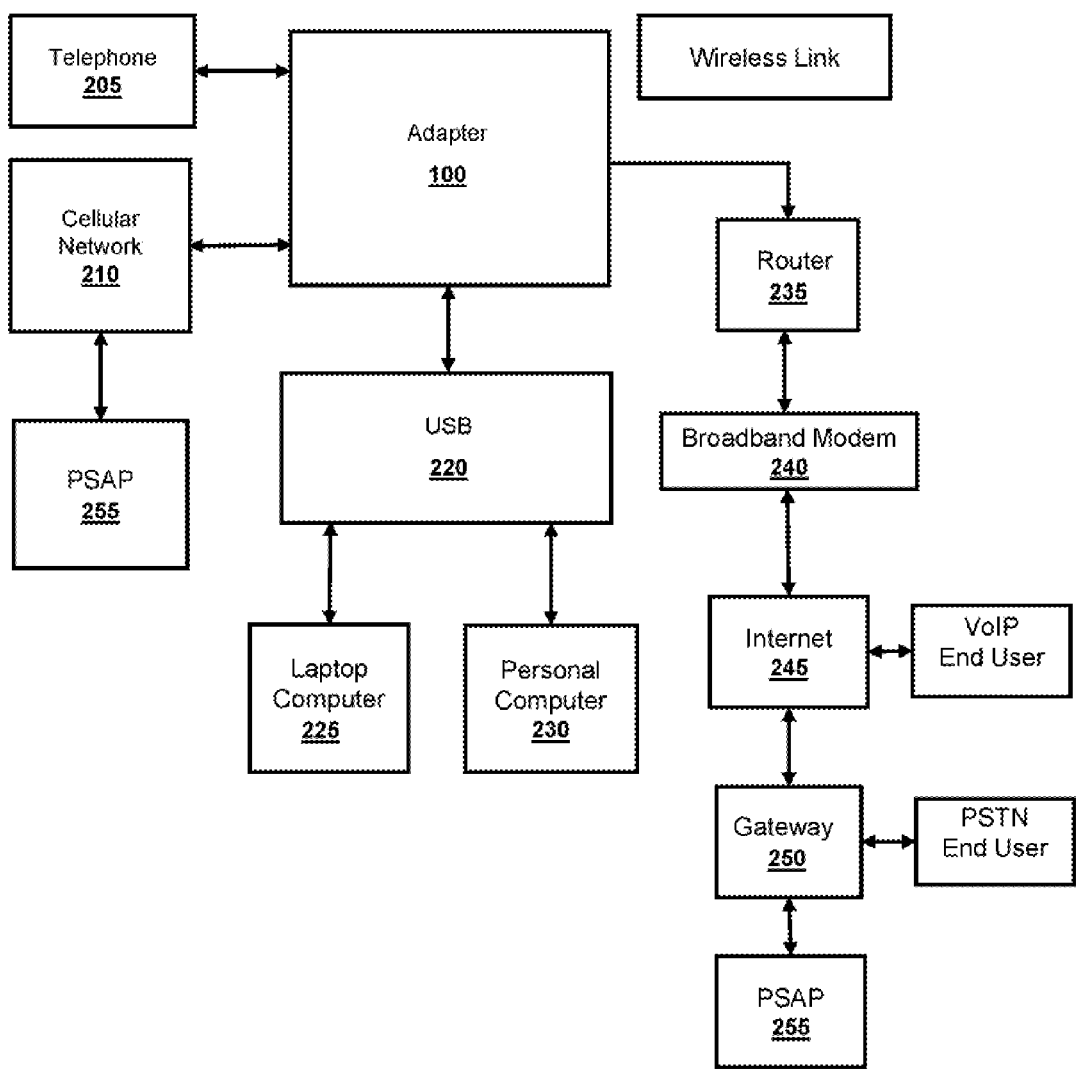
FIG. 2 illustrates a communications network, according to an embodiment of the invention.

The embodiment shown in FIG. 2 is provided for illustration purposes and not by way of limitation. It will be apparent to one of ordinary skill in the art that the elements that make up the communications network can vary and be optimized for different applications.

FIG. 2 illustrates a communications network 200, according to an embodiment of the invention. The communications network 200 includes a telephone 205, cellular network 210, adapter 100, a connector such as a USB connector 220, laptop computer 225, personal computer 230, router 235, a broadband modem 240, Internet 245, gateway 250, public safety answering point (PSAP) 255, VoIP end-user, and PSTN end-user.

According to an embodiment of the invention, the adapter 100 may include a wireless network card 125 which allows the adapter 100 to wirelessly connect to a wide area network, such as the Internet 245. As shown in FIG. 2, the adapter 100 may transmit digitized voice signals to a router 235. The router 235 is of a kind well known by those of ordinary skill in the art, such as an 802.11g router. The router 235 may receive the voice signal and convert it into a packet format for transmission over the Internet 245. Accordingly, the adapter 100 need not be physically connected to the router 235 and therefore does not have to be in close physical proximity to the router 235. Alternatively, the adapter 100 may include a connector such as a USB connector for connecting directly to a laptop or desktop computer. In yet another embodiment, the adapter 100 may include a connector such as a USB connector for connecting directly to a router or broadband modem (which may be a cable, fiber optic, or dsl modem).

The adapter 100 can receive voice inputs from a telephone 205, or from a laptop computer 225 or personal computer 230. In addition, the adapter 100 can receive voice inputs via a connector such as a USB connector 220.

In yet another embodiment (not shown), the laptop computer 225 or the personal computer 230 may be connected directly to the router 235, which permits connection to the Internet via the broadband modem 240. The computer may also include a wireless network card 125 which allows the computer to wirelessly connect to a wide area network, such as the Internet 245. The computer may transmit digitized voice signals to a router 235. The router 235 is of a kind well known by those of ordinary skill in the art, such as an 802.11g router. The router 235 may receive the voice signal and convert it into a packet format for transmission over the Internet 245. Accordingly, the computer need not be physically connected to the router 235 and therefore does not have to be in close physical proximity to the router 235. Alternatively, the computer may include a connector such as an Ethernet or USB connector for connecting directly to the router 235 or broadband modem 240.

The computer can receive voice inputs from a telephone 205, or from an adapter 100. Alternatively, the computer can receive voice inputs via a connector such as a USB connector 220.

As stated above and with reference to FIG. 1(a), the adapter 100 may include a wireless network card 125. The wireless network card 125 is of a kind known to one of ordinary skill in the art, such 802.11b and 802.11g PCI cards. The wireless network card 125 in the adapter 100 can be configured to transmit the digitized voice data across several different networks. One of ordinary skill in the art can appreciate that there are numerous types of wireless PCI cards allowing access to numerous networks, such as Wi-Fi, Wi-Max, EV-DO and HSPDA and others.

The router 235 is optional. In one embodiment, the router 235 transmits the digitized voice signal to the broadband modem 240. The broadband modem 240 can be a wireless broadband modem and can include a cellular link. In another embodiment, the digitized voice signals may be provided to the broadband modem 240 without an intervening router (not shown). Devices such as routers act as access points, or portals, to a packet switched network, such as the Internet 245. The broadband modem 240 encodes and transmits the digitized voice signal across a packet switched network such as the Internet 245. The broadband modem 240 can be cable modem, DSL or fiber optic modem, or satellite or other wireless broadband links. One of ordinary skill in the art can appreciate that the router 235 could be a stand-alone router for a home user or a server in an enterprise setting.

In one embodiment, the transmitted packetized voice signals are received and decoded and converted to analog or digitized voice signals by a soft phone client running on a remote computer. In another embodiment, the transmitted packetized voice signals are received and decoded and converted to analog or digitized voice signals by a gateway 250 and then sent to a PSTN end user at the far-end.

The adapter 100 also includes a cellular chip 130 which may be used for diverting emergency 911 calls from the VoIP system. The CPU 135 in conjunction with the transceiver periodically scans cellular signals from the cellular tower or towers to determine if there is a cellular signal and to determine the cellular tower identifier(s) of the cellular towers. The transceiver may scan cellular signals at any frequency. In one embodiment, for example, the transceiver may continually scan cellular signals from the cellular tower or towers. In another embodiment, for example, the transceiver may intermittently scan cellular signals. The CPU 135 may use the cellular tower identifier(s) and signal strengths to determine the location of the adapter 100 in the manner described above. Once the location of the adapter 100 has been determined, that location identifying information may be stored in its local memory for later use. If there is a subsequent emergency call, then the location identifying information associated with the adapter may be used later to communicate location identifying information to the PSAP over a cellular network or a packet-switched network to aid emergency personnel in identifying the location of the adapter 100.

When the adapter 100 detects an emergency call, if the transceiver detected the presence of a cellular signal, then the CPU 135 may attempt to initiate two-way communication with PSAP 255 over the cellular network via the cellular chip 130. If it is unsuccessful in establishing two-way communication with PSAP 255, then it will route the call as a VoIP call. If the transceiver did not detect the presence of a cellular signal, then the CPU 135 outputs the call as a VoIP call.

In the event that the emergency call is transmitted over the cellular network, then the PSAP 255 receives the call and processes the call as it would process any other call received over the cellular network. The manner in which these calls are processed is known in the art.

In the event that the call is transmitted as a VoIP call, the broadband modem 240 encodes and transmits the packetized voice signal across a packet switched network such as the Internet 245. In one embodiment, the transmitted packetized voice signals are received at a gateway 250 where they are decoded and converted to analog or digitized voice signals. In one embodiment, the gateway 250 that converts the signal from packetized voice signals to analog or digitized voice signals may be part of the VoIP service provider infrastructure. In another embodiment, the gateway 250 that converts the signal from packetized voice signals to analog or digitized voice signals may be part of the infrastructure of a service provider specializing in emergency communications infrastructure. In either case, the analog or digitized voice signals are then sent to the PSAP 255 in a manner known in the art. In another embodiment, the gateway 250 that converts the signal from packetized voice signals to analog or digitized voice signals may be part of the PSAP infrastructure. In yet another embodiment, if the PSAP is capable of receiving packetized voice signals, then the packetized voice signals are sent directly to the PSAP without conversion to analog or digitized voice signals. In accordance with the present invention, whether the emergency call is completed via a cellular network or a VoIP network, location identifying information corresponding to the location of the adapter 100 will be sent to the PSAP 255 to aid emergency personnel in identifying the location of the adapter 100.

Figure 3:
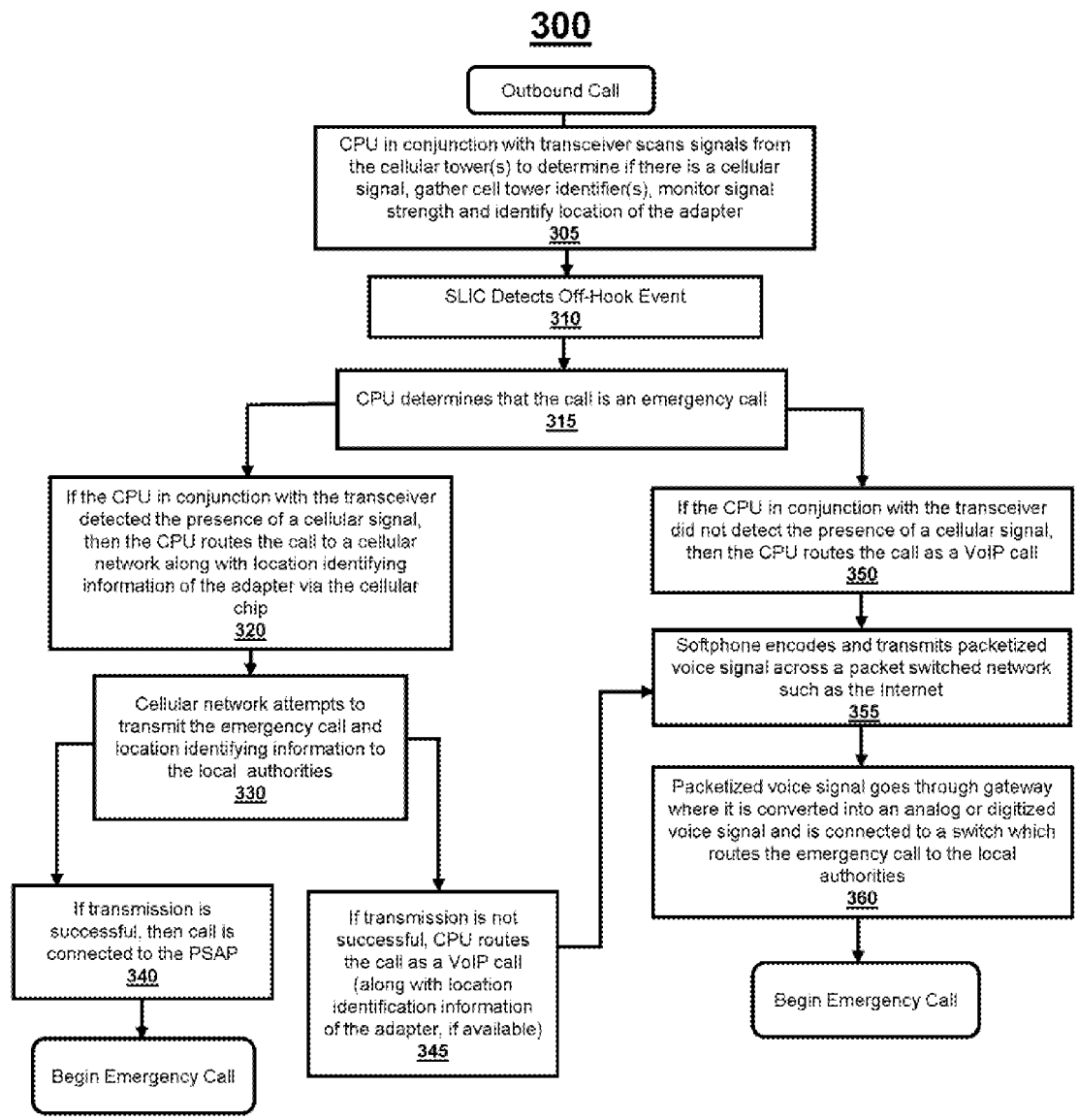
FIG. 3 is a flow chart illustrating the process of making an emergency call, according to an embodiment of the invention.

FIG. 3 is a flow diagram illustrating the process of making an emergency call 300, in accordance with an embodiment of the invention. The process 300 is described with respect to the adapter 100 shown in FIGS. 1(*a*) and 1(*b*), but may be applied to other systems.

As shown in step 305, the CPU in conjunction with the transceiver is periodically scanning signals from the cellular tower or towers to determine if there are one or more cellular signal(s) and to determine the cellular tower identifiers for the cellular towers from which those cellular signals were transmitted to facilitate identifying the location of the adapter 100 using the cellular tower identifiers and the corresponding signal strengths of the cellular signals in the manner described above. In step 310, the SLIC 140 detects an off-hook event and notifies the CPU 135. The DSP (not shown) embedded in the CPU 135 awaits the receipt of the first DTMF digit from the handset. In step 315, the CPU 135 determines that the call is to be an emergency call. This is determined by the user inputting known DTMF digits according to emergency services, such as 911 calls, 311 calls, and other services known to one of ordinary skill in the art.

In step 320, if the CPU in conjunction with the transceiver detected the presence of a cellular signal in step 305, then the CPU 135 routes the call, along with location identifying information associated with the adapter 100, to a cellular network via the cellular chip 130. The cellular network chip 130 (or cellular network circuit) acts to modulate the voice signal in a manner which allows it to be transmitted over a cellular network. It will be apparent to one of ordinary skill in the art that there are numerous ways to implement a cellular network, such as GSM, CDMA, UMTS, LTE and the embodiment provided is not meant to limit the scope of the invention.

In step 330, the cellular network attempts to transmit the emergency call, along with location identifying information associated with the adapter 100, to the appropriate public safety answering point (PSAP) in a way known to one of ordinary skill in the art. By way of example, the cellular network determines the location of the caller, as it does for other cellular callers, and transmits location information to the PSAP along with the actual call. If the transmission of the call over the cellular network is successful, the call is connected to the PSAP in step 340, and the emergency call begins over the cellular network.

If the transmission of the call over the cellular network is not successful, then the CPU routes the call as a VoIP call in step 345. In step 355, the soft phone encodes and transmits the packetized voice signal across a packet switched network such as the Internet. In step 360, the signal goes through a gateway, where it is converted into an analog or digitized voice signal and connected to a switch which routes the emergency call to the local authorities. In other embodiments of the invention (not shown), the packetized signal may go directly to the local authorities without going through a gateway.

In further embodiments of the invention, emergency call re-routing functionality may be placed in other components of a telephone system. For example, a cellular interface and re-routing functionality could be implemented within a telephone handset, within a specialized adaptor coupled to a handset, or within a conventional personal computer coupled in some manner to a handset, headset, or other audio system.

In step 350, if the CPU in conjunction with the transceiver did not detect the presence of a cellular signal in step 310, then the CPU routes the call as a VoIP call. In step 355, the soft phone encodes and transmits the packetized voice signal across a packet switched network such as the Internet. In step 360, the signal goes through a gateway, where it is converted into an analog or digitized voice signal and connected to a switch which routes the emergency call to the local authorities. In other embodiments of the invention (not shown), the packetized signal may go directly to the local authorities without going through a gateway.

In addition, in further embodiments of the invention, determining whether there is a cellular signal may take place in other components of a telephone system. For example, the signal strength determination could be implemented within a telephone handset, within a specialized adaptor coupled to a handset or within a conventional personal computer coupled in some manner to a handset, headset or other audio system.

Figure 4A:
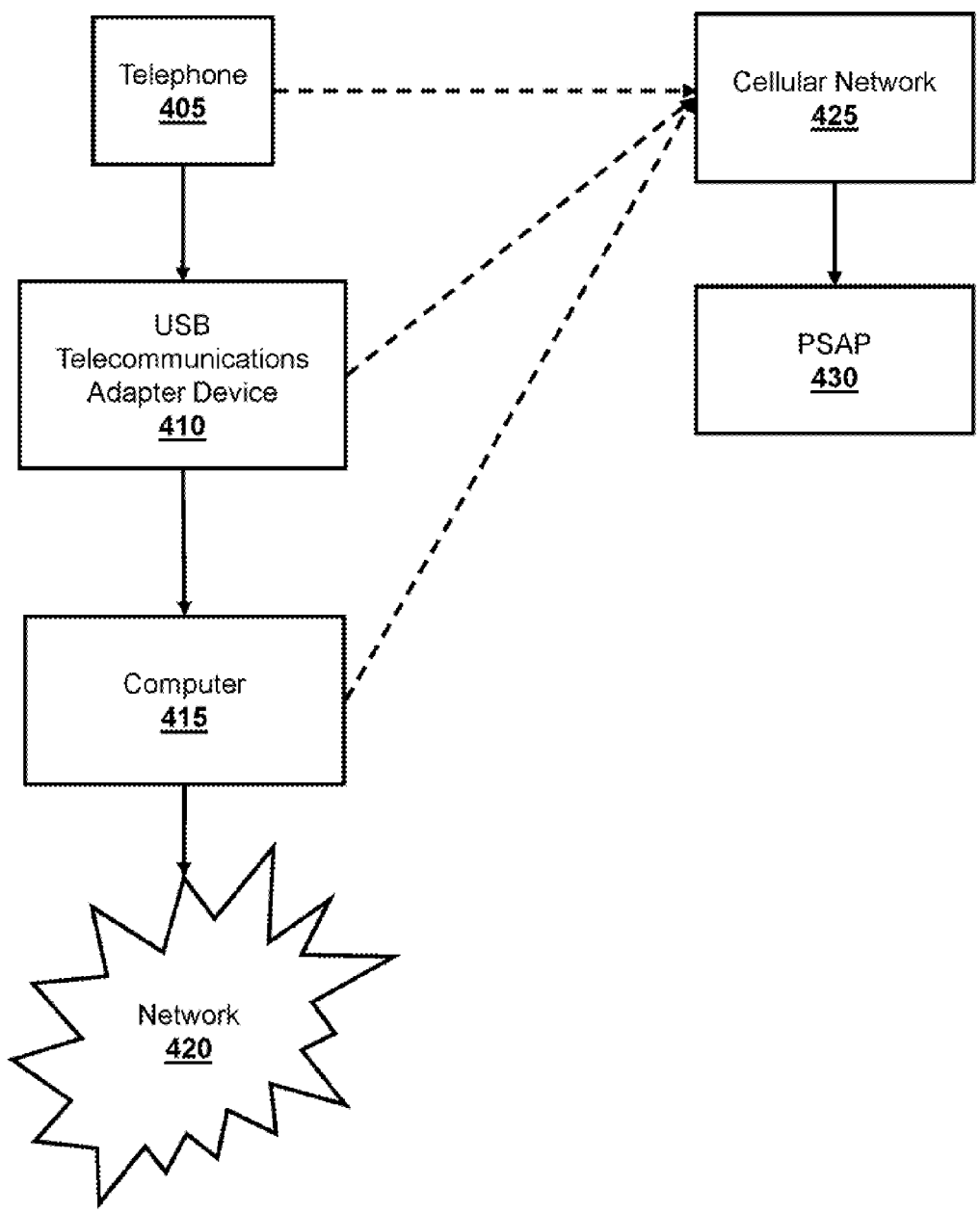
FIGS. 4(a) and 4(b) illustrate a communications network, according to embodiments of the invention.
Figure 4B:
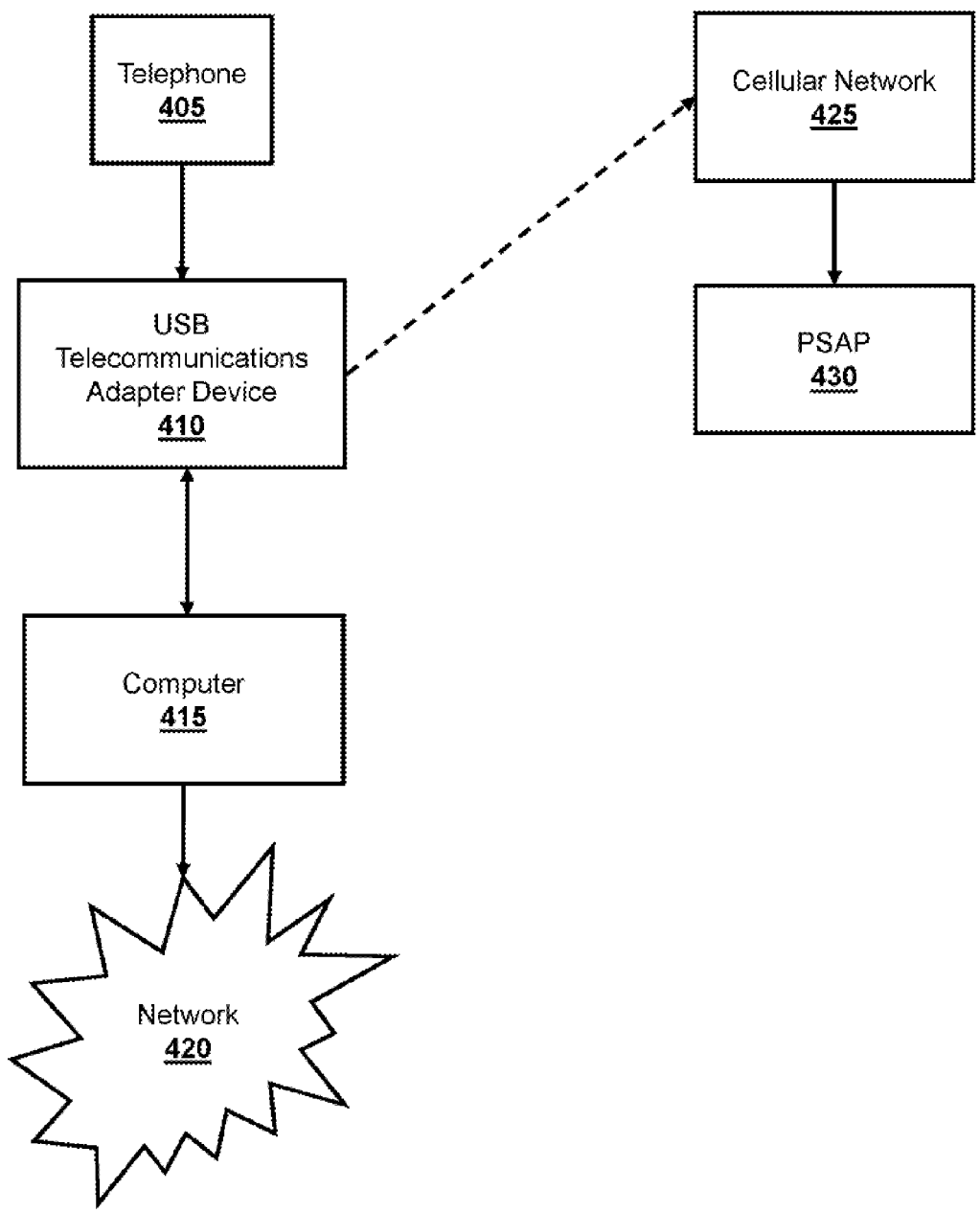

FIGS. 4(*a*) and 4(*b*) may be used to explain several embodiments of the invention. FIG. 4(*a*) depicts a communications network 400, including a telephone 405, USB adapter 410, computer 415, and packet-switched network 420, such as the Internet. In particular, the telephone 405 is coupled to the computer 415 via the USB adaptor 410, but that specific interface is included only by way of example and is not necessary or important to the invention. For example, the telephone 405 may itself be a USB phone and therefore capable of connecting directly to the computer 415 via a USB interface, making an intervening adaptor unnecessary. Other communication protocols may also be used in addition to or instead of USB.

In the system of FIG. 4(*a*), typical calls using the telephone 405 would be routed through the adaptor 410 and computer 415 to a packet-switched network 420 using VoIP technology. Since emergency calls over such a system present problems, as described above, the present invention also provides for the inclusion of emergency call re-routing functionality over a cellular interface, or over some other interface designated for emergency situations. Specifically, the telephone 405, the adaptor 410, or the computer 415 may include a cellular (or emergency) interface, such as a cellular chip or PCMCIA card, and re-routing intelligence, such as specialized application software. The re-routing intelligence, which may be on a CPU separate from the cellular interface or incorporated therein, is capable of detecting that an emergency call is being made, by detecting that "911" has been dialed for example, and (1) re-routing the call over the cellular interface to a cellular network 425 if two-way communication is possible over the cellular network 425, or (2) re-routing the call over the VoIP network if such two-way communication is not possible. The determination of whether two-way communication is possible is made by scanning cellular signals from the cellular tower or towers and if a cellular signal is detected, then attempting two-way communication over the cellular network. In addition, if a cellular signal is detected, the re-routing intelligence will determine whether the attempted two-way communication over the cellular network was successful. If the attempted two-way communication over the cellular network was not successful, then the re-routing intelligence may re-route the call over the VoIP network.

Although the use of specific re-routing intelligence has been discussed, the present invention may use the cellular network to determine location information for the adapter 410 in the manner discussed above, but actually facilitate the completion of emergency calls using only one type of network (e.g., cellular network or packet switched network) without any re-routing option. Once the location of the adapter 100 has been determined, that location identifying information may be stored in its local memory for later use. If there is a subsequent emergency call, then the location identifying information associated with the adapter may be used later to communicate location identifying information to the PSAP over a cellular network or a packet-switched network to aid emergency personnel in identifying the location of the adapter 100.

Note that the cellular interface, the transceiver, and the re-routing intelligence may be included in the phone 405, in the adaptor 410, or in the computer 415. Also note, however, that none of these components need to be located in the same physical device as any of the others. For example, the re-routing intelligence may re-route an emergency call by signaling a separate component that actually includes the cellular interface. In one embodiment, the telephone 405 is an ordinary telephone, while the adaptor 410 includes the cellular interface and the transceiver and the computer 415 includes the re-routing intelligence. In such a system, the re-routing intelligence of the computer 415 detects that an emergency call has been made and checks for a cellular signal. By way of example, the computer itself may detect that an emergency call has been made and check for the presence of a cellular signal, or it may signal the adaptor 410 to check for the presence of a cellular signal. Depending on the implementation, the computer 415 and/or the adaptor must be provided with the capability to detect and respond to such signaling and also to re-route calls over the cellular interface.

In yet another embodiment, the cellular interface is disposed within the telephone 405 while the re-routing intelligence is disposed within the computer 415. In this embodiment, a similar detection and signaling process occurs between the computer and the phone, as will be apparent to those of ordinary skill in the art. Note also that in such an embodiment a separate adaptor component is unnecessary. In those embodiments where the re-routing intelligence and emergency interface are disposed within computer 415, neither telephone 405 nor adaptor 410 would be necessary, particularly where the computer 415 includes all the usual functionality of a normal handset as would be understood by those of ordinary skill in the art.

FIG. 4(*b*) shows the communications network 400 according to a preferred embodiment of the invention. In the system of FIG. 4(*b*), the adaptor 410 includes a cellular (or emergency) interface including a transceiver, such as a cellular chip or PCMCIA card along with re-routing intelligence, as indicated above.

Figure 5:
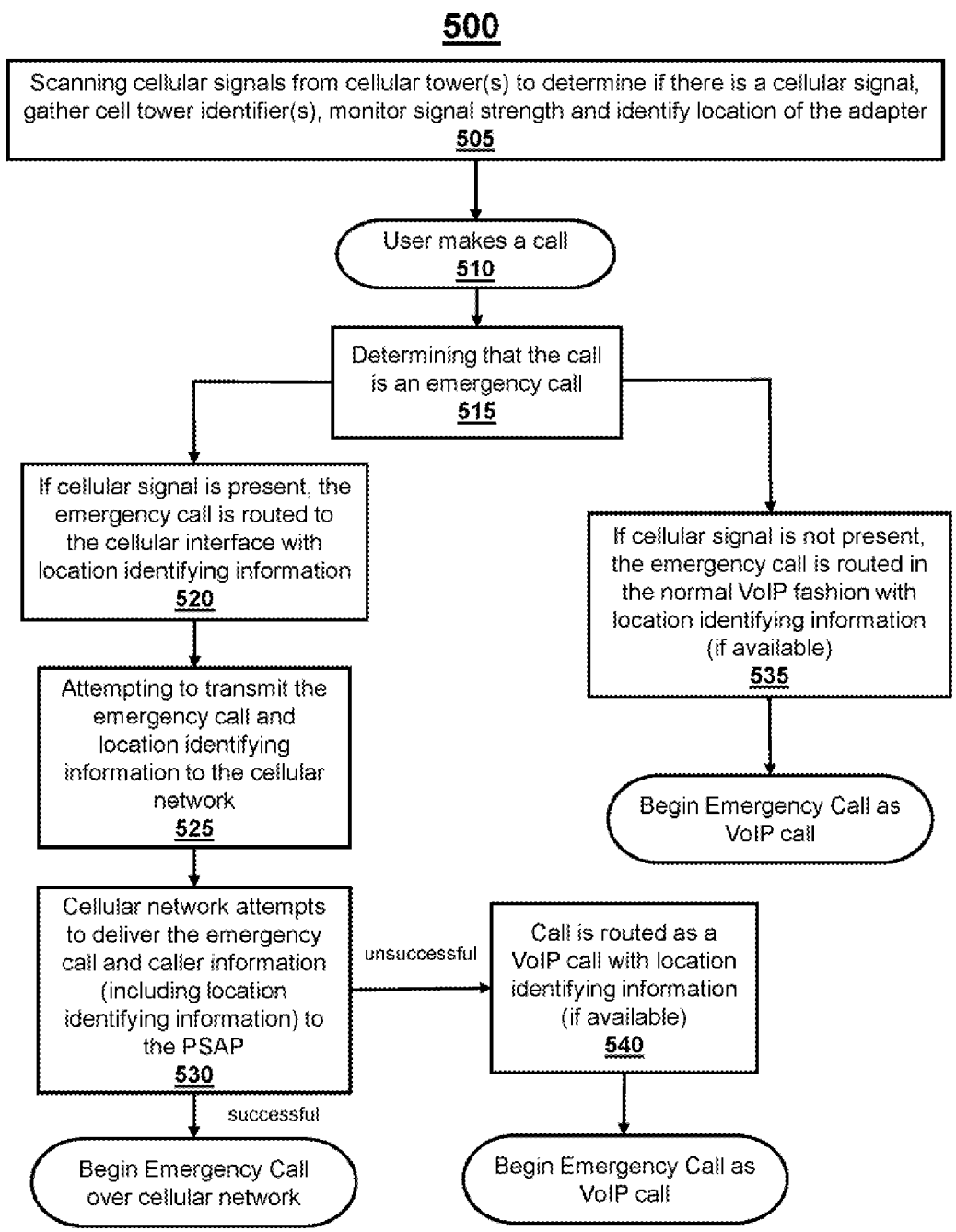
FIG. 5 is a flow chart illustrating the process of making an emergency call, according to an embodiment of the invention.

FIG. 5 depicts a flow diagram of re-routed and non-re-routed emergency calls in accordance with certain aspects of the invention 500. In step 505, the transceiver is periodically scanning cellular signals from the cellular tower or towers to determine if there is a cellular signal, gathering cell tower identifier(s), monitoring signal strength and identifying a location of the adapter. In step 510, the user makes a call. In step 515, the re-routing intelligence determines if the call is an emergency call. If not, the call is routed, along with location identifying information, via a packetized signal as, for example, a VoIP call (not shown). If the transceiver did not detect a cellular signal in step 505, then the emergency call is routed, along with location identifying information corresponding to the adapter (if available), in the normal VoIP fashion in step 535. If the transceiver did detect a cellular signal in step 505, then the emergency call is re-routed, along with location identifying information corresponding to the adapter, to the emergency interface, which in this example is a cellular interface, i.e., cellular chip, in step 520. As noted above, the cellular interface may be disposed in any of various system components and the re-routing may entail certain signaling between components. As shown in step 525, once the call has been re-routed, there is an attempt to transmit the call over the cellular interface to a cellular network, which in turn transmits the call and special service information, including caller location information, such as location identifying information corresponding to the adapter, to a PSAP, in a conventional manner, as shown in step 530.

If either the attempt to re-route the emergency call to the emergency interface fails (not shown) or the attempt to transmit the call over the cellular interface to a cellular network fails, then the call is routed (along with location identifying information corresponding to the adapter, if available) in the normal VoIP fashion in step 540. As noted above, the present invention may use the cellular network to determine location information for a communication device in the manner discussed above, but actually facilitate the completion of emergency calls using only one type of network (e.g., cellular network or packet switched network) without any re-routing option.

Figure 6:
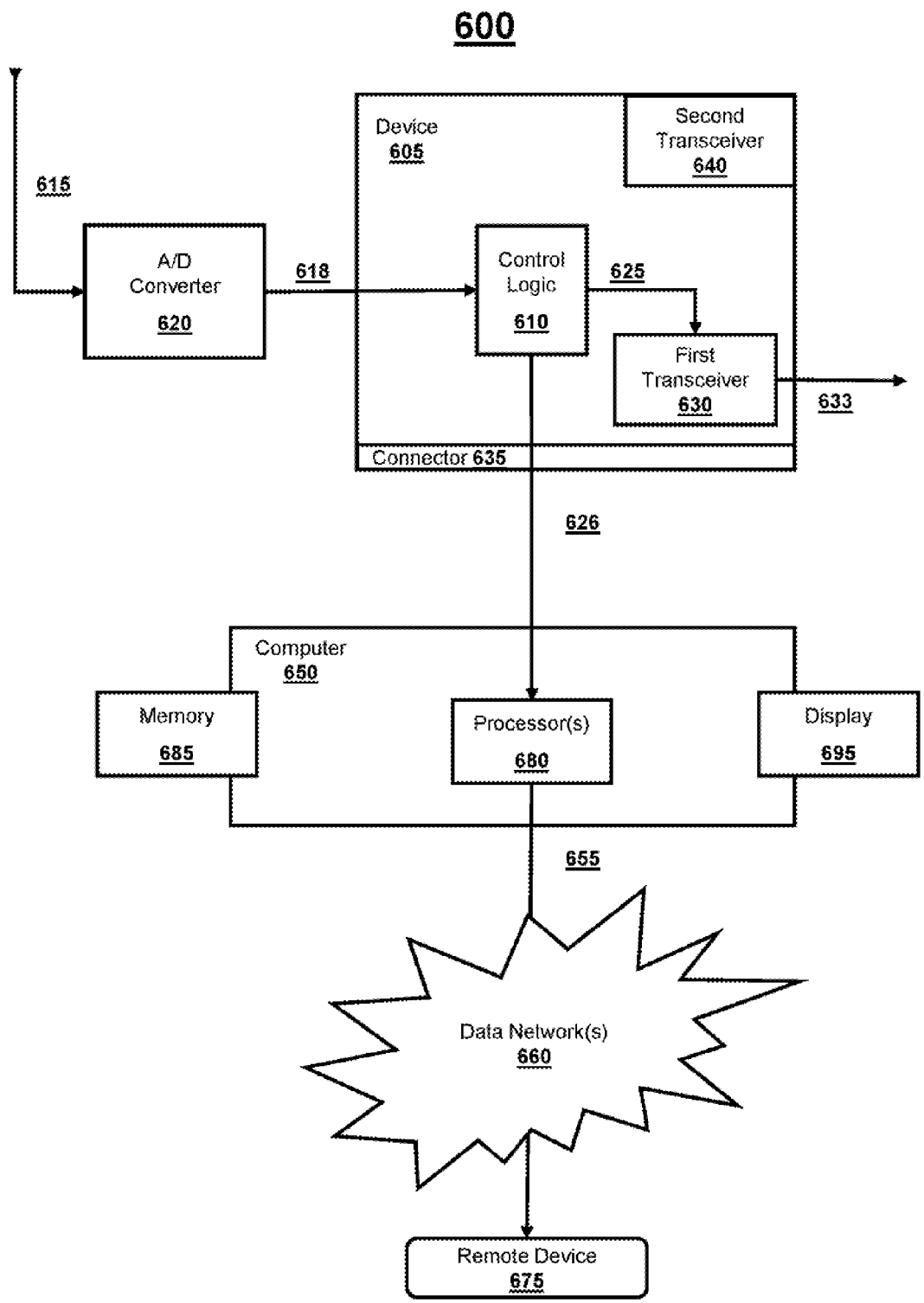
FIG. 6 illustrates a computer system, according to an embodiment of the invention.

FIG. 6 shows a computer system 600 including a device 605 for use with a computer 650. The device 605 includes control logic 610, such as a controller, a dedicated processor and/or a CPU that receives a first signal, such as an analog or digital signal. The analog signal may be a dual-tone multi-frequency based signal. If the control logic 610 receives an analog signal, it may have some associated analog to digital converter to convert the analog signal to a digital signal for processing. Also, if the first signal 618 is a digital signal 618, it may have been converted from an analog signal 615 via the use of an analog to digital converter 620, which could be included in the device 605. Also, the reference to a signal herein may include a signal incorporating multiple signals.

In one embodiment, the CPU in conjunction with the first transceiver 630 periodically scans cellular signals from the cellular tower or towers to determine if there is at least one cellular signal, gather cellular tower identifier(s), and monitor cellular signal strength(s) of the cellular signals from the cellular towers to facilitate identifying the location of the device 650 in the manner described above in connection with adapter 100 and transferring location identifying information corresponding to the device to emergency personnel to aid in locating the device. The control logic 610 evaluates the first signal 618 to determine whether the first signal 618 corresponds to an emergency call, which may be an emergency "911" call. The control logic 610 outputs a second signal 625 if it is determined that the first signal 618 corresponds to an emergency call and that a cellular signal is present, as described below. The second signal 625 may be identical to the first signal 618 or merely derived from the first signal 618.

The first transceiver 630 receives the second signal 625 from the control logic 610 and the first transceiver attempts to transmit a radio signal 633 to establish a two-way communication channel corresponding to the emergency call upon receipt of the second signal 625. The control logic 610 will therefore only send the second signal 625 to the first transceiver 630 if a cellular signal is detected by the first transceiver. The device 605 will then be permitted to attempt to make an emergency services call through a two-way communication channel that may include a commercial mobile radio service ("CMRS"). In an alternative embodiment, the transceiver does not periodically scan for cellular signals for all emergency calls and the second signal will be sent to the transceiver which will attempt to transmit a radio signal 633 to establish a two-way communication channel corresponding to the emergency call.

The control logic 610 may also determine if the first signal 615 corresponds to an outbound call other than an emergency call, if a cellular signal is not present, or if the attempt to transmit the emergency call using the cellular network fails.

In any of these cases, the control logic provides a third signal 626 to the computer 650. The computer 650 then facilitates the transfer of a voice communication 655, which is a packetized signal, corresponding to the outbound call, via one or more data networks 660. The outbound call may be implemented as a VoIP call. The voice communication 655 may include at least one packet of data (not shown) which may also include an address (not shown) corresponding to a remote device 675 that is to receive the packet of data.

As noted above, the present invention may use the cellular network to determine location information for the device 605 in the manner discussed above, but actually facilitate the completion of emergency calls using only one type of network (e.g., cellular network or packet switched network) without any re-routing option.

The device 605 may include a connector 635 that couples the device to the computer 650. The connector 635 may be a USB connector or an Ethernet or other connector. The device 605 may also be wirelessly coupled to a computer via, for example, a second transceiver 640.

The control logic 610 and/or the first transceiver 630 may be implemented on an application specific integrated chip (not shown), which will greatly facilitate its use in a miniature device. The control logic 610 and/or first transceiver 630 may be implemented on a card (e.g., a PCMCIA card) (not shown) to be inserted within a slot of the computer 650. Alternatively, the control logic 610 and/or first transceiver 630 may be built into the computer 650, obviating the need for a separate device 605 or simplifying the device 605 by having only the control logic 610 or first transceiver 630 located therein. In a streamlined implementation of a preferred embodiment, the device 610 and/or computer 650 may be implemented without a subscriber identity module or a connector for a subscriber identity module.

The computer 650 includes one or more processors 680 (e.g., CPU), controllers (not shown) and/or control logic (not shown) coupled to memory 685, such as a RAM, a ROM, an SDRAM, an EEPROM, a flash memory, a hard drive, an optical drive and/or a floppy drive. The control logic 610 of the device 605 may also have such memory associated with it to store software and/or data used by the software to implement the present invention.

The computer 650 may be accessible to a user directly or indirectly via one or more data networks 660, such as a local area network, wide area network, wireless network, or the Internet. If the computer 650 is directly accessible, the user may interact with the computer 650 via input output devices (not shown), such as a keyboard, mouse, trackball, or touch screen. In addition, the computer 650 may have a display 695, such as a monitor, LCD display, or plasma display, which displays information to the user. The computer 650 may also be coupled to a printer (not shown) for printing information.

The software application code may be stored in a computer readable medium such as memory. In one embodiment, the computer 650 may store in a computer readable media, such as the memory 685, the software (and corresponding data) that is used to implement an embodiment of the present invention. However, other computer readable media may be employed as well, e.g., a RAM, a ROM, an SDRAM, an EEPROM, a flash memory, a hard drive, an optical drive and/or a floppy drive. Also stored in the memory 685 of the computer 650 are the data relied upon by the software application code of the present invention. The software application code may also be implemented in hardware via dedicated device incorporating control logic or a controller, for example. The software application code includes software instructions to be executed by the processor 680 or some other processor which is separate from the CPU of the computer 650. Alternatively, the software may be executed by a processor, a controller, or control logic on the device 605. In other embodiments, the software (and corresponding data) that is used to implement the invention may be stored in memory on the device.

In execution, the software application code causes the processor 680 to receive one or more first signals from one or more cellular towers, gather cellular tower identifier(s) corresponding to those cellular towers, monitor the corresponding signal strength(s) of those first signal(s), and identify a location of the device 605 based on at least the cellular tower identifier(s) and the corresponding signal strength(s) of the first signal(s). Thereafter the software application code causes the processor 680 to receive a second signal (e.g., the second signal 618) and evaluate the second signal to determine whether the second signal corresponds to an emergency call. The software application code may do so by, for example, evaluating a signal representing the frequencies of one or more signals corresponding to key presses in a DTMF implementation. Accordingly, if key presses corresponding to "9", "1", "1" are associated with an emergency call, then it shall be determined whether a signal includes indicia of frequencies corresponding to those key presses to identify an emergency call. The software application code also causes the processor 630 to output a third signal (e.g., the third signal 625) to a first transceiver (e.g., the first transceiver 630) if it is determined that the second signal corresponds to an emergency call and that a cellular signal is present. The first transceiver is capable of receiving the third signal (including location identifying information associated with the device 605) from the processor and transmitting a corresponding radio signal (e.g., the radio signal 633) to establish a two-way communication channel corresponding to the emergency call upon receipt of the second signal. The emergency call may be made to, for example, an emergency operator who will also receive the location identifying information associated with the device 605 which will aid emergency personnel, including the emergency operator, in locating the device 605.

In execution, the software application code may also cause the processor 680 to determine that the first signal corresponds to an outbound call other than the emergency call, that a cellular signal is not present, or that an attempted connection over the cellular network failed. In any of these cases, the processor 680 may facilitate the transfer of a voice communication (e.g., the voice communication 655, which may be a digital signal) corresponding to the outbound call via one or more data networks 660. However, the present invention may use the cellular network to determine location information for the device 605 in the manner discussed above, but actually facilitate the completion of emergency calls using only one type of network (e.g., cellular network or packet switched network) without any re-routing option. In the case of detecting non-emergency calls, this may be accomplished in a manner similar to that described above in connection with the detection of an emergency call in a DTMF based implementation, except that a signal is evaluated to determine that it does not contain an indicia of frequencies corresponding to those key presses which are associated with an emergency call. As noted above, the outbound call may be implemented as a VoIP call and the voice communication may include at least one packet of data which may include an address corresponding to a remote device 1150 that is to receive the packet of data.

Figure 7:
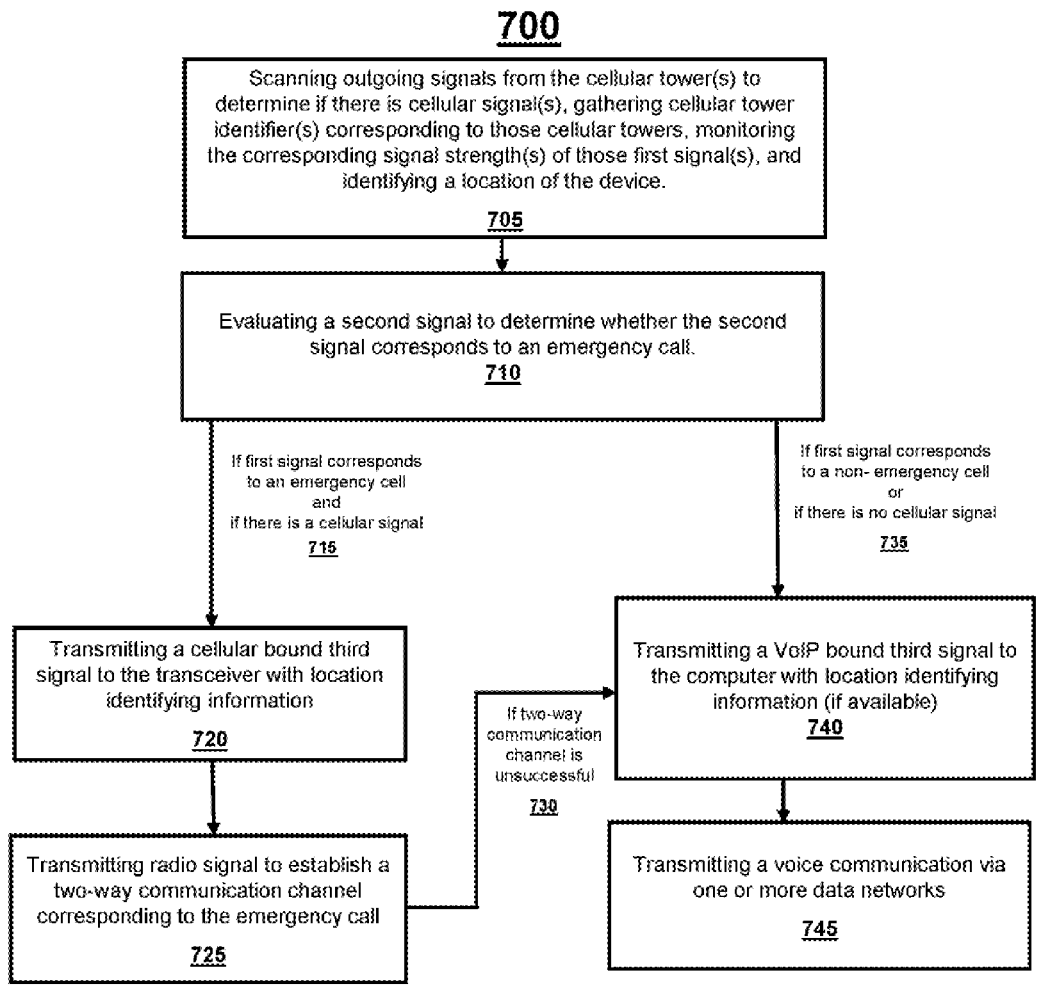
FIG. 7 is a flow chart illustrating the process of making an emergency call, according to embodiments of the invention.

FIG. 7 depicts a method for making a telephone call 700 according to an embodiment of the invention. The method includes step 705, periodically scanning first signals (in this instance cellular signals) from the cellular tower or towers to determine if there is at least one cellular signal present, gathering cellular tower identifier(s) corresponding to those cellular towers, monitoring the corresponding signal strength(s) of those first signal(s), and identifying a location of the device 605 based on at least the cellular tower identifier(s) and the corresponding signal strength(s) of the first signal(s). Next is step 710, evaluating, in a computer or a device (for use with a computer), a second signal (e.g., the second signal 615) to determine whether the second signal corresponds to an emergency call, such as an emergency "911" call. The second signal may be an analog or digital voice signal. The analog signal may be a dual-tone multi-frequency based signal. If the second signal is a packetized signal, it may have been converted from an analog or digitized voice signal via the use of an analog to digital converter (e.g., the analog to digital converter 620). Thereafter, if the second signal corresponds to an emergency call and there is a cellular signal in step 715, then the control logic transmits a third signal (including location identifying information associated with the device 605) to the transceiver in step 720 and the transceiver (e.g., the first transceiver 630, which may or may not be located in the device 605) transmits a radio signal to establish a two-way communication channel corresponding to the emergency call in step 725. The two-way communication channel may include a commercial mobile radio service ("CMRS").

If the two way communication channel is unsuccessful 730, then the control logic transmits a third signal (including, if available, location identifying information associated with the device 605) to the computer in step 740. Likewise, if after step 710, it is determined that the second signal corresponds to a non-emergency call or if there is no cellular signal 735, then the control logic transmits a third signal to the computer in step 740. Thereafter, in step 745, a voice communication is transmitted via a data network (e.g., the data network 660), the voice communication (which may be a packetized signal) corresponding to the outbound call. As noted above, the outbound call may be implemented as a VoIP call and the voice communication may include at least one packet of data and an address corresponding to a remote device (e.g., the remote device 675) that is to receive the packet of data.

As noted above, the present invention may use the cellular network to determine location information for a communication device in the manner discussed above, but actually facilitate the completion of emergency calls using only one type of network (e.g., cellular network or packet switched network) without any re-routing option.

FIG. 8 depicts the transmission of an emergency call 800 according to one embodiment of the invention. In step 805, an emergency call is placed using a VoIP device containing a cellular chip. In step 810, it is determined whether a cellular signal is present. This determination may be based on whether the CPU in conjunction with a transceiver detects the presence of a cellular signal from the cellular tower or towers (not shown). The CPU in conjunction with the transceiver may attempt to detect the presence of a cellular network before step 805, during step 805, after step 805, or any combination thereof. If is it determined that there is a cellular network present, then the cellular tower identifiers will be gathered and the cellular signal strengths will be monitored to facilitate identification of the location of the VoIP device. Thereafter, the CPU attempts transmission of the call over the cellular network 815. In step 825, the CPU determines if the transmission of the call over the cellular network was successful. If the transmission is successful 830, the call is connected to the PSAP using cellular technology and location identifying information associated with the VoIP device is also transferred to the PSAP from the VoIP device. Likewise, if it is determined that a cellular network is not present, then the call is routed as a VoIP call in step 835. If the transmission is not successful, the call is routed as a VoIP call in step 845 (along with location identifying information associated with the VoIP device, if available). However, the present invention may use the cellular network to determine location information for the VoIP device in the manner discussed above, but actually facilitate the completion of emergency calls using only one type of network (e.g., cellular network or packet switched network) without any re-routing option. In step 850, the VoIP call is sent to a gateway where the call is then connected to the PSAP. In some instances, the gateway may convert the call from packetized voice signals to analog or digitized voice signals. In other cases, it may remain as packetized voice signals through to the PSAP.

When the emergency call is routed as a VoIP call, the conversion from packetized voice signals to analog or digitized voice signals, if necessary, may occur at a gateway of the VoIP service provider, or a gateway of a service provider that specializes in emergency call handling, or a gateway at the PSAP site, or any other gateway capable of converting packetized voice signals to analog or digitized voice sign.

Figure 9A:
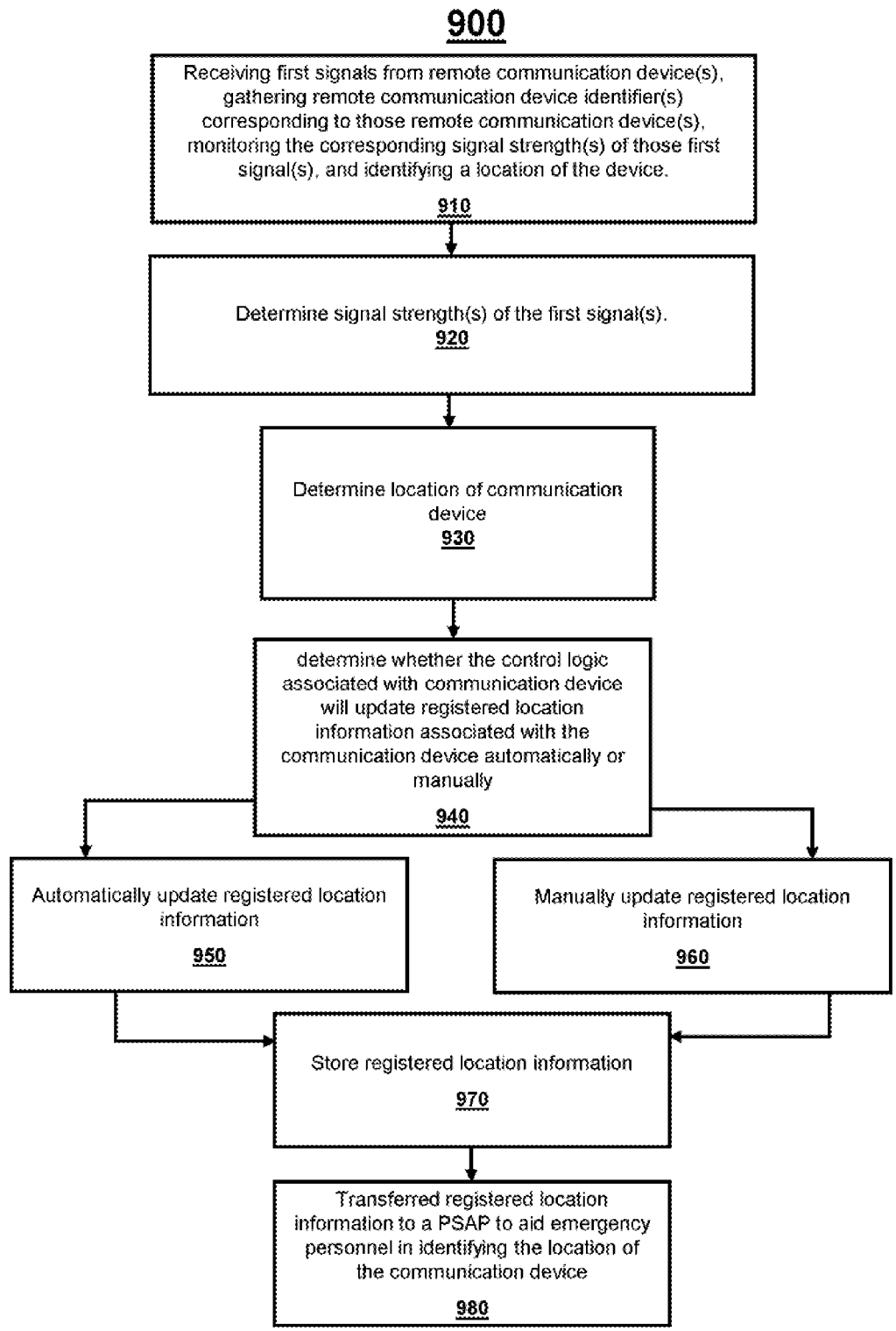
FIG. 9(a) is a flow chart illustrating the process of determining a location of a communication device using identifying information received from other communication devices.

FIG. 9 is a flow chart illustrating the process 900 of determining a location of a communication device using identifying information received from other remote communication devices. In accordance with one exemplary embodiment, a communication device is provided for use with a computer, and includes a transceiver and control logic.

In step 910, the control logic receives one or more first signals carrying corresponding one or more remote communication device identifiers (e.g., cellular tower identifiers or wireless access point identifiers (e.g., MAC address)) that each identify one or more remote communication devices (e.g., cellular towers or wireless access points). In step 920, the control logic determines one or more signal strengths of the one or more first signals. Thereafter, in step 930, the control logic determines a location of the communication device based on the one or more remote communication device identifiers (or one or more locations of the one or more remote communication devices) and the one or more signal strengths of the first signals from the remote communication devices. In step 940, it is determined whether the control logic will update registered location information associated with the communication device automatically or manually.

In step 950, the control logic updates the registered location information automatically. The registration ensures that emergency personnel will have identifying information for a particular location at which the communication device may be found. The control logic may store one or more prior registered locations for the communication device in memory and may update the registered location information as new location information is determined by using the locations of remote communication devices and the signal strengths of communication signals that have been received from those remote communication devices to calculate an estimated location of the communication device using well-known triangulation techniques. The calculation of the location of the communication device may occur within the control logic, or may be done externally by a location positioning service which transfers relevant location information to the control logic.

The update of the registered location information includes assigning the calculated location of the communication device as a new registered location of said communication device. In accordance with one aspect of a preferred embodiment, a new registered location of the communication device is only assigned if the calculated location of the communication device is more than a predetermined distance from a registered location that has previously been assigned to the communication device. If it is not, then the registered location will be the closest previously assigned registered location stored in the local memory coupled to the control logic. This is done out of a recognition that the calculated location of the communication device is only an estimate and may not be the actual location of the communication device. In some instances a location, which was previously identified as the registered location and which is very close to the calculated location, may be treated as the actual location of the communication device.

If the update is not done automatically, then in step 960 a user of the communication device may be prompted to update the registered location information of the communication device using the calculated location of the communication device. The above-mentioned indicator is then selected from the registered location information of the communication device. A display may be provided for the communication device, and the control logic may cause the display to display different and user selectable options for the registered location including the newly calculated location. In any event, the updating of registered location information need not be done incident to the handling of an emergency call, but may be done in advance to facilitate timely updates to the registered location information that may be stored in memory associated with the communication device or some other device coupled thereto.

Once a registered location for the communication device is stored in local memory (or a remote database) in step 970, it is available for later use in the event of an emergency call and may be transferred in step 980 to a PSAP (to aid emergency personnel in identifying the location of the communication device) via a cellular network or a packet switched network. As an alternative to the use of a registered location, the calculated location may be transferred to a PSAP without being registered.

FIG. 9(*b*) depicts location identifying information for different components within a cellular network that illustrates the use of an exemplary embodiment of the invention. In addition, signal strength information associated with cellular communications within the cellular network is also depicted in FIG. 9(*b*). In particular, FIG. 9(*b*) depicts the location of remote communication devices (i.e., cellular towers shown as red dots), and the actual and estimated location of a communication device (i.e., an adapter whose actual location is shown as a green house and whose estimated location is shown as a blue dot). The estimated location of the communication device is calculated in accordance with triangulation techniques that are well known in the art, as noted above. Additional location identifying information for the devices is shown along with signal strength information for signals transmitted by the remote communication devices (i.e., the cellular towers) and received by the communication device (i.e. the adapter). The location identifying information for the communication device (i.e., the adapter) may be displayed to facilitate the update of registered location information in the manner described above.

Although the above-mentioned embodiments describe how location identifying information can be sent to emergency personnel to aid them in identifying the location of a communication device, which may be a mobile communication device, those embodiments may be enhanced by also sending a telephone number associated with the communication device in addition to the location identifying information. In this way emergency personnel may call the communication device if the call is dropped for any reason.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims, in which all terms are meant in their broadest reasonable sense unless otherwise indicated therein.

We claim:

1. A communication device for use with a computer, said communication device comprising:
   a transceiver; and
   control logic that (a) receives via said transceiver, one or more first signals from one or more cellular towers including data corresponding to one or more cellular tower identifiers that each identify one or more cellular towers, (b) determines one or more signal strengths of the one or more first signals and a location of the communication device based on the one or more cellular tower identifiers and the one or more signal strengths of the one or more first signals, (c) receives a second signal corresponding to an emergency call, and (d) transfers, via a cellular network or a packet switched network, a third signal carrying an indicator of the location of said communication device based on the one or more cellular tower identifiers and the one or more signal strengths of the one or more first signals to a remote device to aid emergency personnel in identifying the location of said communication device, said control logic implementing said emergency call as one of a cellular-based call via said cellular network or a VoIP call via said packet switched network.

2. The communication device of claim 1, wherein said control logic causes the location of said communication device to be displayed on a display associated with said communication device or said computer.

3. The communication device of claim 1, wherein said control logic outputs a fourth signal including data corresponding to the one or more cellular tower identifiers and receives a fifth signal including data comprising one or more locations of the cellular towers having the one or more cellular tower identifiers, wherein said control logic determines the location of the communication device using the one or more locations of the cellular towers and the one or more signal strengths of the one or more first signals.

4. The communication device of claim 3, wherein the one or more locations of the cellular towers are retrieved from a database using the one or more cellular tower identifiers.

5. The communication device of claim 1, wherein said control logic outputs a fourth signal including data corresponding to the one or more cellular tower identifiers and the one or more signal strengths, receives data comprising information relating to the location of said communication device, and determines the location of said communication device based on the information.

6. The communication device of claim 3, wherein the location of the communication device is used to update registered location information of the communication device, said indicator being selected from the registered location information of the communication device that has been updated.

7. The communication device of claim 6, wherein the registered location information is stored in a memory of one of the communication device and the computer.

8. The communication device of claim 6, wherein the registered location information is stored in a database that is remote from said communication device and said computer.

9. The communication device of claim 3, wherein the location of the communication device is used by a user of the communication device to update registered location information of the communication device, said indicator being selected from the registered location information of the communication device that has been updated.

10. The communication device of claim 6, wherein the update is carried out automatically.

11. The communication device of claim 3, wherein the location of the communication device is used by a user of the communication device to update registered location information of the communication device with the aid of a display upon which the location of the communication device is depicted.

12. The communication device of claim 1, wherein said communication device is incorporated into said computer.

13. The communication device of claim 1, wherein said control logic determines when said second signal corresponds to an emergency call.

14. A method for making a telephone call via a communication device that is coupled to a computer, the method comprising:
   receiving, at a communication device via a transceiver, one or more first signals from one or more cellular towers including data corresponding to one or more cellular tower identifiers that each identify one or more cellular towers;
   determining, via control logic, one or more signal strengths of the one or more first signals and a location of the communication device based on the one or more cellular tower identifiers and the one or more signal strengths of the one or more first signals;
   receiving, at the communication device, a second signal corresponding to an emergency call;
   transferring, via a cellular network or a packet switched network, a third signal carrying an indicator of the location of said communication device based on the one or more cellular tower identifiers and the one or more signal strengths of the one or more first signals to a remote device to aid emergency personnel in identifying the location of said communication device; and
   implementing said emergency call as one of a cellular-based call via said cellular network or a VoIP call via said packet switched network.

15. The method of claim 14, further comprising displaying the location of the communication device on a display associated with said communication device or said computer.

16. The method of claim 14, further comprising outputting a fourth signal including data corresponding to the one or more cellular tower identifiers and receiving a fifth signal including data comprising one or more locations of the cellular towers having the one or more cellular tower identifiers, wherein said determining a location of said communication device is performed using the one or more locations of the cellular towers and the one or more signal strengths of the one or more first signals.

17. The method of claim 16, wherein the one or more locations of the cellular towers are retrieved from a database using the one or more cellular tower identifiers.

18. The method of claim 14, further comprising outputting a fourth signal including data comprising the one or more cellular tower identifiers and the one or signal strengths, receiving data comprising information relating to the location of said communication device, and determining the location of said communication device based on said information.

19. The method of claim 16, wherein the location of said communication device is used to update registered location information of the communication device, said indicator being selected from the registered location information of the communication device that has been updated.

20. The method of claim 19, wherein the registered location information is stored in a memory of one of the communication device and the computer.

21. The method of claim 19, wherein the registered location information is stored in a database that is remote from said communication device and computer.

22. The method of claim 16, wherein the location of the communication device is used by a user of the communication device to update registered location information of the communication device, said indicator being selected from the registered location information of the communication device that has been updated.

23. The method of claim 19, wherein the update is carried out automatically.

24. The method of claim 16, wherein the location of the communication device is used by a user of the communication device to update registered location information of the communication device with the aid of a display upon which the location of the communication device is depicted.

25. The method of claim 14, further comprising determining when said second signal corresponds to an emergency call.

26. A processor program product for use in connection with one or more processors for executing software instructions, said processor program product comprising:
   a non-transitory processor usable medium having processor readable program code embodied therein for causing said one or more processors to (a) receive via a transceiver of a communication device one or more first signals from one or more cellular towers including data corresponding to one or more cellular tower identifiers that each identify one or more cellular towers, (b) determine one or more signal strengths of the one or more first signals and a location of the communication device including the transceiver based on the one or more cellular tower identifiers and the one or more signal strengths of the one or more first signals, (c) receive a second signal corresponding to an emergency call, and (d) transfer, via a cellular network or a packet switched network, a third signal carrying an indicator of the location of said communication device to a remote device to aid emergency personnel in identifying the location of said communication device, said one or more processors implementing said emergency call as one of a cellular-based call via said cellular network or a VoIP call via said packet switched network.

27. The processor program product of claim 26, wherein said processor readable program code causes said one or more processors to have the location of said communication device be displayed on a display associated with said communication device or a computer coupled to the communication device.

28. The processor program product of claim 26, wherein said processor readable program code causes said one or more processors to output a fourth signal carrying the one or more cellular tower identifiers and receive a fifth signal carrying one or more locations of the one or more cellular towers having the one or more cellular tower identifiers, wherein said one or more processors determine a location of the communication device using the one or more locations of the cellular towers and the one or more signal strengths of the one or more first signals.

29. The processor program product of claim 28, wherein the one or more locations of the cellular towers are retrieved from a database using the one or more cellular tower identifiers.

30. The processor program product of claim 26, wherein said processor readable program code causes said one or more processors to output a fourth signal carrying the cellular tower identifiers and the signal strengths, receive information relating to the location of said communication device, and determine the location of said communication device based on the information.

31. The processor program product of claim 28, wherein said processor readable program code causes said one or more processors to have the location of the communication device be used to update registered location information of the communication device, said indicator being selected from the registered location information of the communication device that has been updated.

32. The processor program product of claim 31, wherein said processor readable program code causes said one or more processors to have the registered location information stored in a memory of one of said communication device and a computer.

33. The processor program product of claim 31, wherein said processor readable program code causes said one or more processors to have the registered location information stored in a database that is remote from said communication device and a computer.

34. The processor program product of claim 28, wherein said processor readable program code causes said one or more processors to receive input from a user of the communication device such that the location of the communication device is used by said one or more processors to update registered location information of the communication device, said indicator being selected from the registered location information of the communication device that has been updated.

35. The processor program product of claim 31, wherein said processor readable program code causes said one or more processors to carry out the update automatically.

36. The processor program product of claim 28, wherein said processor readable program code causes said one or more processors to receive input from a user of the communication device such that the location of the communication device is used by said one or more processors to update registered location information of the communication device, said update being carried out with the aid of a display upon which the location of the communication device is depicted.

37. The processor program product of claim 26, wherein said processor readable program code causes said processor to determine when said second signal corresponds to an emergency call.

\* \* \* \* \*